US011394722B2

(12) United States Patent
Price et al.

(10) Patent No.: US 11,394,722 B2
(45) Date of Patent: Jul. 19, 2022

(54) SOCIAL MEDIA RULE ENGINE

(71) Applicant: ZeroFOX, Inc., Baltimore, MD (US)

(72) Inventors: Michael Price, Baltimore, MD (US); James Foster, Baltimore, MD (US); Christopher B. Cullison, Westminster, MD (US)

(73) Assignee: ZeroFOX, Inc., Baltimore, MD (US)

( * ) Notice: Subject to any disclaimer, the term of this patent is extended or adjusted under 35 U.S.C. 154(b) by 846 days.

(21) Appl. No.: 15/944,176

(22) Filed: Apr. 3, 2018

(65) Prior Publication Data

US 2018/0288070 A1 Oct. 4, 2018

Related U.S. Application Data

(60) Provisional application No. 62/481,449, filed on Apr. 4, 2017.

(51) Int. Cl.
*H04L 9/40* (2022.01)
*G06F 8/30* (2018.01)
(Continued)

(52) U.S. Cl.
CPC .............. *H04L 63/126* (2013.01); *G06F 8/31* (2013.01); *G06F 16/24568* (2019.01);
(Continued)

(58) Field of Classification Search
CPC . H04L 63/126; H04L 63/1433; H04L 67/306; H04L 63/10; G06F 21/62; G06F 21/55; G06F 21/6245; G06F 16/288; G06F 16/9535; G06F 16/24568; G06F 8/31; G06Q 50/01
See application file for complete search history.

(56) References Cited

U.S. PATENT DOCUMENTS 8,087,084 B1   12/2011   Andruss et al.
8,131,745 B1    3/2012   Hoffman et al.
(Continued)

FOREIGN PATENT DOCUMENTS

CN          102662950         9/2012

OTHER PUBLICATIONS

Leveraging Online Social Networks for a Real-time Malware Alerting System, pp. 272-275 (Year: 2013).*
(Continued)

*Primary Examiner* — Albert M Phillips, III
(74) *Attorney, Agent, or Firm* — DLA Piper LLP (US)

(57) ABSTRACT

A computer implemented method includes receiving instructions from a user for identifying data on one or more social networks, wherein the instructions received from the user comprise one or more conditions and one or more actions, identifying, on the one or more social networks, data that is associated with one or more social entities, determining one or more characteristics of the identified data, determining, based on the one or more characteristics of the identified data, that the identified data meets one or more conditions for identifying data specified in the instructions received from the user, in response to determining that the identified data meets one or more conditions specified in the instructions received from the user, performing one or more actions specified in the instructions received from the user.

18 Claims, 16 Drawing Sheets

(51) Int. Cl.
  *H04L 67/306* (2022.01)
  *G06F 16/28* (2019.01)
  *G06F 16/9535* (2019.01)
  *G06F 16/2455* (2019.01)
  *G06F 21/62* (2013.01)
  *G06F 21/55* (2013.01)
  *G06Q 50/00* (2012.01)

(52) U.S. Cl.
  CPC ........ *G06F 16/288* (2019.01); *G06F 16/9535* (2019.01); *G06F 21/55* (2013.01); *G06F 21/62* (2013.01); *G06F 21/6245* (2013.01); *H04L 63/1433* (2013.01); *H04L 67/306* (2013.01); *G06Q 50/01* (2013.01); *H04L 63/10* (2013.01)

(56) References Cited

U.S. PATENT DOCUMENTS

| | | | |
|---|---|---|---|
| 8,225,413 | B1 | 7/2012 | De et al. |
| 8,234,168 | B1 | 7/2012 | Lagle Ruiz et al. |
| 8,306,922 | B1 | 11/2012 | Kunal et al. |
| 8,311,950 | B1 | 11/2012 | Kunal et al. |
| 8,380,803 | B1 | 2/2013 | Stibel et al. |
| 8,392,230 | B2 | 3/2013 | Stibel et al. |
| 8,484,741 | B1 | 7/2013 | Chapman |
| 8,484,744 | B1 | 7/2013 | De et al. |
| 8,601,596 | B2 | 12/2013 | Wu et al. |
| 8,635,703 | B1 | 1/2014 | Belani et al. |
| 8,655,899 | B2 | 2/2014 | Kennedy et al. |
| 8,677,481 | B1 | 3/2014 | Lee |
| 8,732,455 | B2 | 5/2014 | Wong et al. |
| 8,782,080 | B2 | 7/2014 | Lee et al. |
| 8,782,217 | B1 | 7/2014 | Arone |
| 8,826,443 | B1 | 9/2014 | Raman et al. |
| 8,826,446 | B1 | 9/2014 | Liu et al. |
| 8,856,879 | B2 | 10/2014 | Schechter et al. |
| 8,862,569 | B2 | 10/2014 | Xu et al. |
| 8,909,646 | B1 | 12/2014 | Fabrikant et al. |
| 9,027,134 | B2 | 5/2015 | Foster et al. |
| 9,055,097 | B1 | 6/2015 | Foster et al. |
| 9,070,088 | B1 | 6/2015 | Baveja |
| 9,077,747 | B1 | 7/2015 | Chen et al. |
| 9,083,729 | B1 | 7/2015 | Doshi et al. |
| 9,106,691 | B1 | 8/2015 | Burger et al. |
| 9,197,419 | B1 | 11/2015 | Chandrasekhar et al. |
| 9,210,156 | B1 | 12/2015 | Little et al. |
| 9,225,676 | B1 | 12/2015 | Shoham |
| 9,338,186 | B2 | 5/2016 | Wollenstein et al. |
| 9,374,374 | B2 | 6/2016 | Steinberg et al. |
| 9,674,214 | B2 | 6/2017 | Foster et al. |
| 10,009,360 | B1 | 6/2018 | Todd et al. |
| 10,387,972 | B2 | 8/2019 | O'Sullivan et al. |
| 2002/0073086 | A1 | 6/2002 | Thompson et al. |
| 2004/0187013 | A1 | 9/2004 | Heath et al. |
| 2005/0198031 | A1 | 9/2005 | Pezaris |
| 2006/0168066 | A1 | 7/2006 | Helsper et al. |
| 2007/0244807 | A1 | 10/2007 | Andringa et al. |
| 2007/0245422 | A1 | 10/2007 | Hwang et al. |
| 2008/0103800 | A1 | 5/2008 | Domenikos |
| 2008/0126318 | A1 | 5/2008 | Frankovitz |
| 2008/0177834 | A1 | 7/2008 | Gruhl et al. |
| 2008/0196099 | A1 | 8/2008 | Shastri |
| 2008/0208868 | A1 | 8/2008 | Hubbard |
| 2008/0262877 | A1 | 10/2008 | Hagroder |
| 2008/0288330 | A1 | 11/2008 | Hildebrand et al. |
| 2008/0288382 | A1 | 11/2008 | Smith et al. |
| 2008/0300964 | A1 | 12/2008 | Raghunandan |
| 2009/0037975 | A1 | 2/2009 | Ishikawa et al. |
| 2009/0063284 | A1 | 3/2009 | Turpin et al. |
| 2009/0192853 | A1 | 7/2009 | Drake et al. |
| 2010/0100406 | A1 | 4/2010 | Lim |
| 2010/0138925 | A1 | 6/2010 | Barai et al. |
| 2010/0174813 | A1 | 7/2010 | Hildreth et al. |
| 2010/0205662 | A1 | 8/2010 | Ibrahim et al. |
| 2010/0241621 | A1 | 9/2010 | Randall |
| 2011/0125826 | A1 | 5/2011 | Erhart et al. |
| 2011/0145279 | A1 | 6/2011 | Chunilal |
| 2011/0167011 | A1 | 7/2011 | Paltenghe |
| 2011/0191200 | A1 | 8/2011 | Bayer et al. |
| 2011/0276396 | A1 | 11/2011 | Rathod |
| 2012/0030732 | A1 | 2/2012 | Shaty |
| 2012/0047560 | A1 | 2/2012 | Underwood et al. |
| 2012/0047581 | A1 | 2/2012 | Banerjee et al. |
| 2012/0130863 | A1 | 5/2012 | Tedjamulia et al. |
| 2012/0159647 | A1 | 6/2012 | Sanin et al. |
| 2012/0167231 | A1 | 6/2012 | Garcia et al. |
| 2012/0180135 | A1 | 7/2012 | Hodges |
| 2012/0191594 | A1 | 7/2012 | Welch et al. |
| 2012/0203590 | A1 | 8/2012 | Deb et al. |
| 2012/0296845 | A1 | 11/2012 | Andrews et al. |
| 2012/0296965 | A1 | 11/2012 | Srivasta |
| 2012/0303722 | A1 | 11/2012 | Richter et al. |
| 2013/0018823 | A1 | 1/2013 | Masood |
| 2013/0085953 | A1 | 4/2013 | Bhola |
| 2013/0110802 | A1 | 5/2013 | Shenoy et al. |
| 2013/0117284 | A1 | 5/2013 | Roozen et al. |
| 2013/0124538 | A1 | 5/2013 | Lee et al. |
| 2013/0138735 | A1 | 5/2013 | Kanter et al. |
| 2013/0139236 | A1* | 5/2013 | Rubinstein .......... H04L 63/1483 726/7 |
| 2013/0151609 | A1 | 6/2013 | Rubenstein |
| 2013/0204669 | A1 | 8/2013 | Percy et al. |
| 2013/0205215 | A1 | 8/2013 | Dunn et al. |
| 2013/0239217 | A1 | 9/2013 | Kindler |
| 2013/0268357 | A1 | 10/2013 | Heath |
| 2013/0282819 | A1 | 10/2013 | Mehta et al. |
| 2013/0339186 | A1 | 12/2013 | French et al. |
| 2013/0340089 | A1 | 12/2013 | Steinberg et al. |
| 2014/0052540 | A1 | 2/2014 | Rajaram et al. |
| 2014/0067656 | A1 | 3/2014 | Cohen Ganor et al. |
| 2014/0082182 | A1 | 3/2014 | Doan |
| 2014/0123632 | A1 | 5/2014 | Shibuya et al. |
| 2014/0129632 | A1 | 5/2014 | Sutton et al. |
| 2014/0129942 | A1 | 5/2014 | Rathod |
| 2014/0137257 | A1 | 5/2014 | Martinez et al. |
| 2014/0150109 | A1 | 5/2014 | Fire et al. |
| 2014/0156321 | A1 | 6/2014 | Coury et al. |
| 2014/0162598 | A1 | 6/2014 | Villa-Real |
| 2014/0172989 | A1 | 6/2014 | Rubinstein et al. |
| 2014/0201843 | A1 | 7/2014 | Hibbert et al. |
| 2014/0208424 | A1 | 7/2014 | Hudack et al. |
| 2014/0325662 | A1 | 10/2014 | Foster et al. |
| 2014/0337972 | A1 | 11/2014 | Foster et al. |
| 2014/0337973 | A1 | 11/2014 | Foster et al. |
| 2014/0358888 | A1* | 12/2014 | Whitelaw .......... H04L 67/535 707/709 |
| 2015/0052138 | A1* | 2/2015 | Sutton .................. H04L 51/12 707/737 |
| 2015/0082448 | A1 | 3/2015 | Elovici et al. |
| 2015/0088897 | A1 | 3/2015 | Sherman et al. |
| 2015/0101053 | A1 | 4/2015 | Sipple |
| 2015/0112753 | A1 | 4/2015 | Suvarna |
| 2015/0220751 | A1 | 8/2015 | Syben |
| 2015/0222657 | A1 | 8/2015 | Chu et al. |
| 2015/0229665 | A1 | 8/2015 | Foster et al. |
| 2015/0229666 | A1 | 8/2015 | Foster et al. |
| 2015/0264084 | A1 | 9/2015 | Kashyap et al. |
| 2015/0310205 | A1 | 10/2015 | Pruthi et al. |
| 2016/0028758 | A1 | 1/2016 | Ellis et al. |
| 2016/0065594 | A1 | 3/2016 | Srivastava et al. |
| 2016/0065610 | A1 | 3/2016 | Peteroy et al. |
| 2016/0173520 | A1 | 6/2016 | Foster et al. |
| 2016/0184710 | A1 | 6/2016 | Zerr et al. |
| 2016/0196334 | A1 | 7/2016 | Bastide et al. |
| 2016/0217140 | A1 | 7/2016 | Delaney et al. |
| 2016/0255109 | A1 | 9/2016 | Koyanagi et al. |
| 2016/0308897 | A1 | 10/2016 | Chapman |
| 2016/0381034 | A1 | 12/2016 | Chan et al. |
| 2017/0034179 | A1 | 2/2017 | Carames |
| 2017/0061469 | A1 | 3/2017 | Garrity et al. |
| 2017/0070458 | A1 | 3/2017 | Kunieda et al. |
| 2017/0082573 | A1 | 3/2017 | Vingerhoets et al. |
| 2017/0111385 | A1 | 4/2017 | Madhu et al. |

(56) References Cited

U.S. PATENT DOCUMENTS

| | | | |
|---|---|---|---|
| 2017/0126729 A1 | 5/2017 | Oberheide |
| 2017/0200015 A1 | 7/2017 | Gonzalez |
| 2017/0286867 A1 | 10/2017 | Bell et al. |
| 2017/0344626 A1 | 11/2017 | Pitelka et al. |
| 2018/0033027 A1 | 2/2018 | Ganesh et al. |
| 2018/0047114 A1 | 2/2018 | Haaland |
| 2018/0060326 A1 | 3/2018 | Kuo et al. |
| 2018/0084013 A1 | 3/2018 | Dalton et al. |
| 2018/0124108 A1 | 5/2018 | Irimie et al. |
| 2018/0191849 A1 | 7/2018 | Xu |
| 2018/0234435 A1 | 8/2018 | Cohen et al. |
| 2018/0234447 A1 | 8/2018 | Mueen et al. |
| 2018/0316683 A1 | 11/2018 | Larkina et al. |

OTHER PUBLICATIONS

Stieglitz, et al., "Social media analytics—an interdisciplinary approach and its implications for information systems", Business & Information Systems Engineering 6.2, 2014, pp. 89-96.

Google Scholar, Blocking and Deleting Unwanted Social Media Posts NPL Search Results, 2000.

Kontaxis et al., "Detecting Social Network Profile Cloning" http://ieeexplore.ieee.org/stamp/stamp.jsp?tp=&arnumber=5766886&tag=1, pp. 295-300, 2011.

Liu et al., "A Framework for Computing the Privacy Scores of Users in Online Social Networking," http://cs-people.bu.edu/evimaria/papers/tkdd-pr.pdf, Dec. 2010, pp. 1-30.

Tchuente et al., "A Community Based Algorithm for Deriving Users' Profiles from Egocentrics Networks" http://ieeexplore.ieee.org/stamp/stamp.jsp?tp=&arnumber=6425752i, 2012, pp. 266-273, 2012.

"How do I report a fake account that's pretending to be me?," Dec. 2012, Retrieved from the Internet <URL: web.archive.org/web/20121226111810/https://www.facebook.com/help/174210519303259>, Retrieved on Aug. 12, 2015, 1 page.

Socialimpostor.com, May 2012; Retrieved from the Internet <URL: web.archive.org/web/20120504213219/http://www.socialimpotor.com/>, Retrieved on Aug. 12, 2015, 3 pages.

Notice of Allowance issued in U.S. Appl. No. 14/445,203 dated Feb. 11, 2015, 7 pages.

Office Action issued in U.S. Appl. No. 13/842,716 dated Aug. 13, 2014, 12 pages.

Office Action issued in U.S. Appl. No. 13/842,716 dated Mar. 23, 2015, 22 pages.

Office Action issued in U.S. Appl. No. 14/218,522 dated Dec. 31, 2014, 13 pages.

Office Action issued in U.S. Appl. No. 14/218,522 dated Jul. 8, 2014, 9 pages.

Office Action issued in U.S. Appl. No. 14/327,068 dated Aug. 12, 2014, 12 pages.

Office Action issued in U.S. Appl. No. 14/327,068 dated Jan. 26, 2015, 18 pages.

Office Action issued in U.S. Appl. No. 14/327,068 dated May 22, 2015, 22 pages.

Office Action issued in U.S. Appl. No. 14/445,203 dated Sep. 18, 2014, 8 pages.

Office Action issued in U.S. Appl. No. 14/445,274 dated Apr. 27, 2015, 18 pages.

Office Action issued in U.S. Appl. No. 14/445,274 dated Sep. 11, 2014, 11 pages.

Office Action issued in U.S. Appl. No. 14/566,971 dated May 29, 2015, 18 pages (no new art cited).

Office Action issued in U.S. Appl. No. 14/566,971 dated Feb. 13, 2015, 23 pages.

Office Action issued in U.S. Appl. No. 14/690,804 dated Aug. 27, 2015, 34 pages.

Office Action issued in U.S. Appl. No. 14/445,274 dated Sep. 11, 2015, 16 pages.

Office Action issued in U.S. Appl. No. 13/842,716 dated Oct. 1, 2015, 20 pages.

Office Action issued in U.S. Appl. No. 14/566,971 dated Nov. 4, 2015, 12 pages.

Office Action issued in U.S. Appl. No. 14/445,274 dated Jan. 21, 2016, 17 pages (no new art cited).

Office Action issued in U.S. Appl. No. 14/690,804 dated Mar. 11, 2016, 18 pages (no new art cited).

Office Action issued in U.S. Appl. No. 14/566,971 dated Mar. 25, 2016, 16 pages (no new art cited).

Office Action issued in U.S. Appl. No. 13/842,716 dated Apr. 26, 2016, 26 pages.

Office Action issued in U.S. Appl. No. 14/690,804 dated Jun. 17, 2016, 19 pages.

Office Action issued in U.S. Appl. No. 14/445,274 dated Jun. 30, 2016, 19 pages.

Notice of Allowance issued in U.S. Appl. No. 14/566,971 dated Oct. 28, 2016, 11 pages.

Office Action issued in U.S. Appl. No. 15/207,052 dated Dec. 2, 2016, 19 pages.

NPL Search Terms, Web Search History, Dated Oct. 22, 2020, 1 page.

\* cited by examiner

SOCIAL MEDIA RULE ENGINE

CROSS REFERENCE TO RELATED APPLICATION

This application claims the benefit of U.S. Provisional Application No. 62/481,449, filed Apr. 4, 2017, the contents of which are incorporated by reference herein.

FIELD

The present application relates to computer security.

BACKGROUND

Traditional approaches to combating cyber threats focus on securing endpoints and networks through reactive security measures that are focused on securing computing devices. Anti-virus programs, for example, can be used to detect malicious software associated with local system-level attacks (e.g., a virus attached to an email) and, when defenses have already been breached, to quarantine dangerous files that are detected within a computer system. Firewalls and other edge security devices can be used to establish a perimeter around sensitive systems by controlling the passage of information between networks, so as to reduce the risk of unauthorized access.

Modern cyber threats, however, evolve alongside computer technology, and attackers can be expected to leverage whatever means are available in order compromise or bypass traditional defenses. The development and expansion of social media, for instance, has introduced significant information security risk to both individuals and organizations. These risks include targeted social-based cyber-attacks, fraud, impersonations, and social engineering. The evolving risk necessitates security technology that is predictive rather than reactive in nature, and that identifies dormant maliciously-minded entities before they initiate an attack.

SUMMARY

In one aspect, instructions are received from a user for identify data on one or more social networks, where the instructions received from the user comprise one or more conditions and one or more actions, data that is associated with one or more social entities is identified on one or more social networks, one or more characteristics of the identified data are determined, based on the one or more characteristics of the identified data, determining that the identified data meets one or more conditions specified in the instructions received from the user, and performing one or more actions specified in the instructions received from the user in response to determining that the identified data meets one or more conditions specified in the instructions received from the user.

In another aspect, the method includes receiving additional instructions from the user, wherein the additional instructions received from the user comprise one or more additional conditions and one or more additional actions. In yet another aspect, the method includes determining, based on the one or more characteristics of the identified data, that the identified data meets one or more additional conditions specified in the additional instructions received from the user, and performing one or more additional actions specified in the additional instructions received from the user in response to determining that the identified data meets the one or more additional conditions specified in the additional instructions received from the user. In another aspect, the instructions received from the user comprise code executable by one or more processors.

In yet another aspect, the instructions received from the user comprise scripting language code. In another aspect, the method includes continuously scanning the one or more social networks, wherein the data that is associated with the one or more social entities is identified during a scan. In another aspect, the instructions received from the user specify the one or more social networks. In yet another aspect, the instructions received from the user specify the one or more social entities. In another aspect, the one or more conditions specified in the instructions received from the user comprise the identified data include specified content. In another aspect, the one or more actions specified in the instructions received from the user comprise generating a notification.

Other implementations of these aspects include corresponding systems, apparatus, and computer programs, configured to perform the described techniques, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Predictive and active social risk management technology reduces the risks posed to individuals and enterprises by cyber threats that target and exploit the social vector. Traditional approaches to combating cyber threats focus on endpoint and perimeter security, providing reactive protection through, for example, anti-virus software, email and web gateways, firewalls, and intrusion detection systems. Cyber threats have evolved, however, and attacks now leverage social network and social media communications as means of bypassing traditional protections. The evolving risk necessitates security technology that is predictive and active rather than reactive in nature, and that identifies dormant malicious entities before they can launch an attack.

In more detail, an active social risk defense engine that identifies live attacks can be paired with a predictive analysis framework that identifies dormant risks before attacks occur. The predictive analysis framework can be driven by a scoring algorithm that can determine and score a risk posed by a social entity by analyzing characteristics of a target URL, file, or social communication that is associated with the social entity. The framework can analyze the target via a variety of analytical factors, and can dynamically determine which factors to employ, where each factor employed by the algorithm is associated with one or more characteristics of the target and/or social entity. Based on the result of analysis, the algorithm can score the risk posed by the social entity, and can recommend or take appropriate security action based on a comparison of the social risk score to a social risk threshold.

Figure 1:
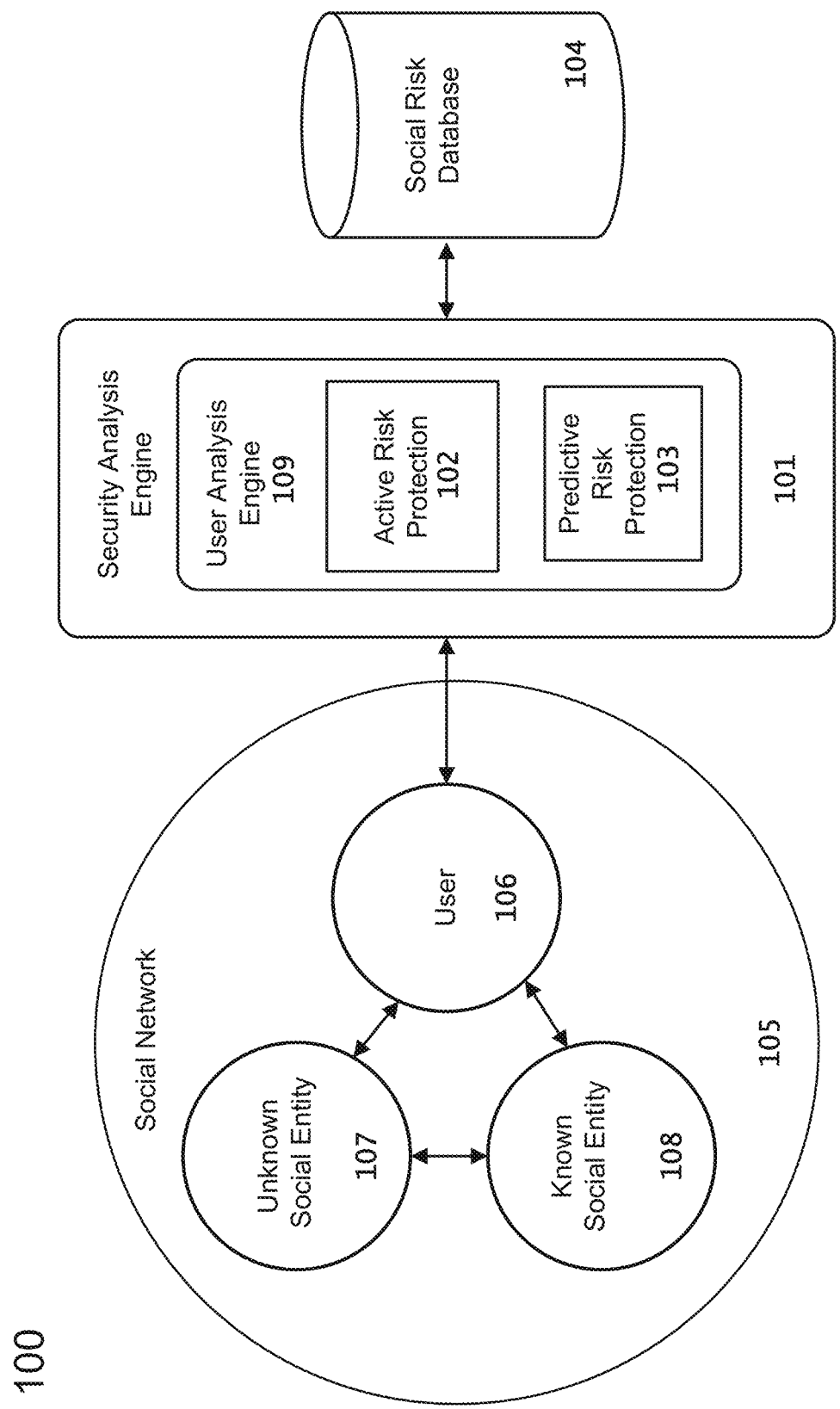
FIG. 1 is a diagram of an example of a system that provides security against social risks.

FIG. 1 is a diagram of an example of a system that provides security against social risks. A risk could be a threat posed by a social entity. The system 100 includes a security analysis engine 101 that includes a user analysis engine 109. The user analysis engine 109 includes an active risk protection module 102 and a predictive risk protection module 103, as well as a social risk database 104. The security analysis engine 101, the user analysis engine 109, and the social risk database 104 may be used to provide security against risks arising from social network 105, such as risks posed to a user 106 by unknown social entity 107 and/or known social entity 108. Security analysis engine 101, social risk database 104, and user 106 may be connected through a network, such as the Internet, and user 106, unknown social entity 107 and known social entity 108 may communicate or may otherwise be connected through social network 105. The active risk protection module 102 and the predictive risk protection module 103 of the user analysis engine 109 may be implemented using a single computer, or may instead be implemented using two or more computers that interface through the network. Similarly, security analysis engine 101 and social risk database 104 may be implemented using a single computer, or may instead be implemented using two or more computers that interface through the network. In some implementations, the security analysis engine 1010 may include a user analysis engine. In other implementations, the user analysis engine may be implemented on a separate computer that is in communication through the network to the security analysis engine 101.

Active risk protection module 102 of user analysis engine 109 may be used to protect user 106 from immediate security risks by, for example, thwarting live attacks. In more detail, either of unknown social entity 107 or known social entity 108 may attempt to communicate with, or connect to, user 106. In response to an attempt by a social entity at communication or connection with user 106, active risk protection module 102 may identify a URL, file, or social communication associated with the social entity, and may initiate a security action after performing an analysis related to the identified URL, file, or social communication.

In more detail, Uniform Resource Locators function as addresses that are used, for example, to specify the location of documents on the World Wide Web. An individual URL, which may be referred to as a web address, is a specific character string that references (i.e. provides the location of) a resource. For example, http://zerofox.com references the homepage of ZeroFox, a cyber-security technology company. Risk protection module 102 may identify an association between a social entity and a URL when, for example, the source of the URL is a social communication originating with the social entity, or when the URL references a social network profile of the social entity. A social communication may be, for example, a post on a social network, or a message sent between users of a social network.

Risk protection module 102 may determine, based on the URL associated with the social entity attempting to connect to or communicate with user 106, that the social entity is a known entity, such as known social entity 108. The determination may involve, for example, identifying an entry in social risk database 104 that is associated with the social entity, the entry including the URL and a social risk score for the social entity. Alternatively, risk protection module 102 may determine, based on, for example, an absence of an entry associated with the social entry in social risk database 104, that the social entity is an unknown entity, such as unknown social entity 107. The determination may involve, for example, identifying an identity as a known entity only for a specific period of time. Prior to the expiration of the specified period of time, a social entity that was scanned and identified as a known entity will be considered to be a known entity, while after the expiration it will again be considered to be an unknown entity.

In response to determining that the social entity attempting to connect to or communicate with user 106 is a known entity, risk protection module 102 may identify the social risk score that is associated with the social entity, and may recommend or take appropriate security action based on a comparison of the social risk score to a social risk threshold.

A social risk score is a calculation of the security risk associated with a target URL, file, or social communication and thus, the risk posed by a scored social entity that is associated with the target. Social risk scores may be determined by the predictive risk protection module 103 of security analysis engine 101, which may proactively identify cyber threats, before attacks occur. The predictive risk protection module 103 may be driven by a scoring algorithm that can determine and score a risk posed by a dormant social entity by analyzing a target URL, file, or social communication that is associated with the social entity, prior to a user's engagement with the social entity. The social risk scores determined by the predictive protection module 103 may be associated with corresponding URLs in entries that are generated by security analysis engine 101, and that are stored in social risk database 104.

A variety of analytical factors can be used by the scoring algorithm to analyze a target URL, file, or social communication, where each factor employed by the algorithm is associated with one or more characteristics of the target and/or the social entity associated with the target. The characteristics of the target and/or social entity that may be analyzed by the scoring algorithm include contextual, lexical, visual, audio, profile, URL, file, network, destination content, domain, host, and application characteristics. The algorithm may analyze, for example, content of a resource that is referenced by a target URL, such as a social network profile of the social entity that is referenced by the target. The algorithm may analyze the content or function of a target file, and/or the type, size, or attributes of the target file.

The algorithm may dynamically determine which factors to employ in analyzing a target URL, file, or social communication. The algorithm may, for example, assign a confidence level to a social risk score that is determined based on a first set of factors and, if the confidence level falls below a confidence threshold, the algorithm may refine the social risk score based on one or more additional sets of factors, until the confidence level assigned to the social risk score meets or exceeds the confidence threshold.

A social risk threshold represents a level of tolerance for risk, and a particular social risk threshold may be associated with a particular user, organization or entity. Security analysis engine 101 may assign a social risk threshold to a user, organization, or entity based on, for example, input from the user, or one or more characteristics of the user, user's social network activity, and/or a collection of users associated with the organization or entity.

When the risk protection module 102 determines that the social entity attempting to connect to follow or communicate with user 106 is a known entity, the risk protection module 102 may identify the social risk score that is associated with the social entity based on entry in social risk database 104, and may recommend or take appropriate security action based on a comparison of the social risk score to the user 106's social risk threshold. The risk protection module 102 may, for example, alert the user to the potential risk posed by the social entity, and/or block the social entity's communication or connection attempt.

When, on the other hand, the risk protection module 102 determines that the social entity attempting to connect to or communicate with user 106 is an unknown entity, the risk protection module 102 may use the scoring algorithm to generate a social risk score for the unknown entity, and may store the generated social risk score in a new entry in the social risk database 104, the new entry including the URL associated with the unknown entity and/or characteristics of the social entity or user. The risk protection module 102 may then recommend or take appropriate security action based on a comparison of the social risk score to the user 106's social risk threshold.

The predictive risk protection module 103 may, in addition to proactively determining social risk scores, alert the user 106 to risks posed by other social entities based on entries in social risk database 104. The predictive risk protection module 103 may, for example, alert the user 106 to risks posed by social entities with which user 106 has had no contact. For example, the risk protection module 103 may identify a connection between user 106 and known social entity 108, in addition to a connection between known social entity 108 and another social entity in social network 105. An entry in social risk database 104 may indicate that the social risk score for known social entity 108 falls below user 106's social risk threshold, but another entry may indicate that the social risk score associated with the social entity with which user 106 has had no contact exceeds user 106's social risk threshold. In cases like this, the predictive risk protection module 103 may, based on a comparison between a social entity's social risk score and a user's social risk threshold, initiate a security action relating to the social entity, even before the social entity attempts to connect to or communicate with the user.

Figure 2:
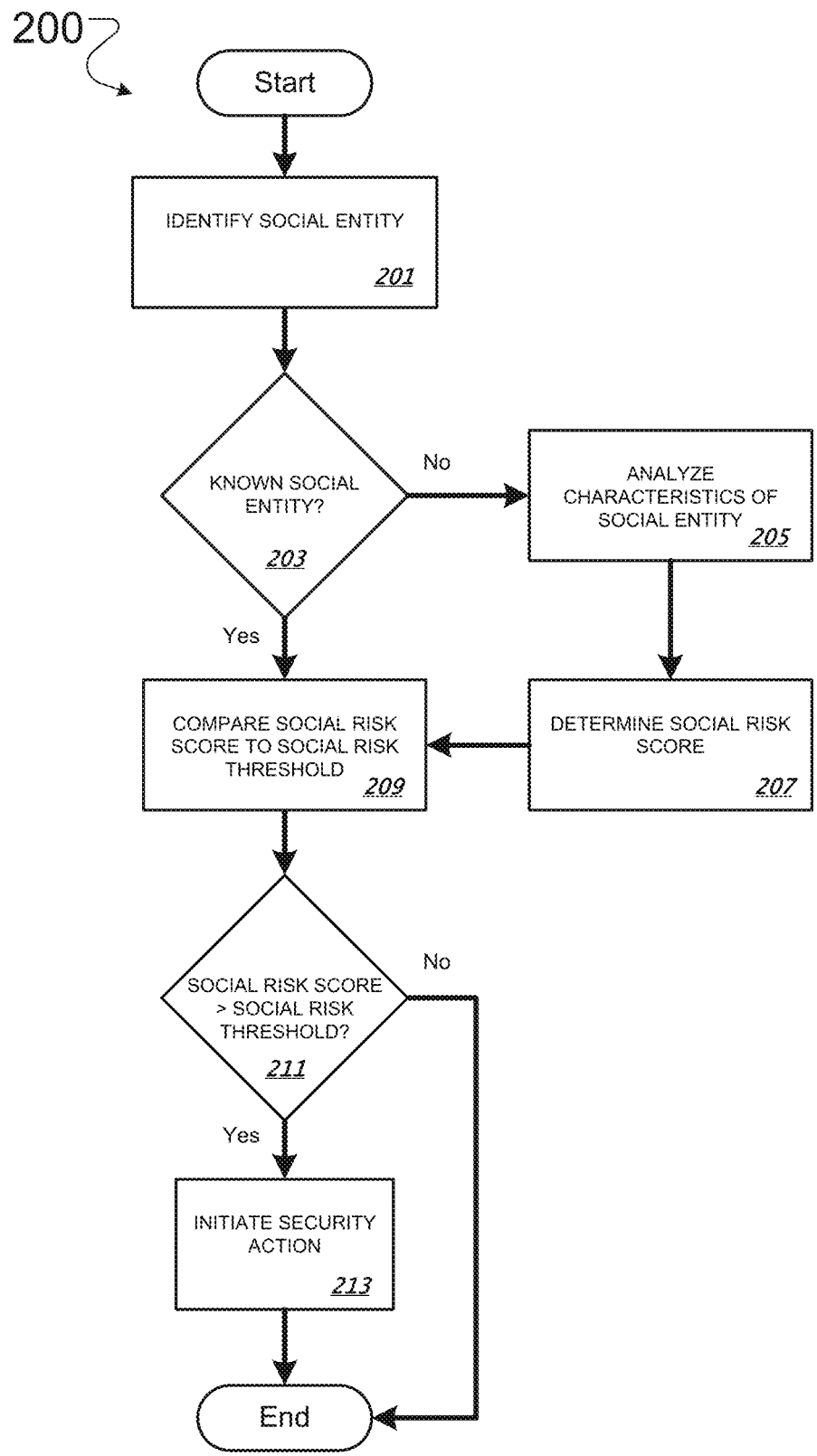
FIG. 2 is a flowchart of an example of a process for determining a social risk score for a social entity, and for taking an appropriate security action based on the determined social risk score.

FIG. 2 is a flowchart of an example of a process 200 for determining a social risk score for a social entity, and for taking an appropriate security action based on the determined social risk score. The process 200 may be implemented, for example, using system 100, although other systems or configurations may be used. In such an implementation, one or more parts of the process may be executed by security analysis engine 101, which may interface with other computers through a network. Security analysis engine 101 may retrieve data involved in the process, such as data used in assessing a security risk posed by a social entity, from one or more local or remote data sources, such as social risk database 104 and user 106.

Process 200 begins when security analysis engine 101 identifies a social entity based on a URL that is associated with the social entity (201). The social entity may be identified, for example, by active risk protection module 102 of the user analysis engine 109 in response to an attempt by the social entity to connect to or to communicate with user 106. Alternatively, the social entity may be identified by predictive risk protection module 103, as it proactively seeks out dormant risks.

After identifying the social entity, security analysis engine 101 may determine whether the social entity is a known entity, or is instead an unknown entity (203). In some implementations, the security analysis engine 101 or the user analysis engine 109 may determine whether the social entity is a known entity or an unknown entity. If the social entity is a known entity, the security analysis engine 101 may compare the social risk score that is associated with the social entity in social risk database 104 to a social risk threshold that is associated with the user 106 (209), and may determine whether the social risk score exceeds the social risk threshold (211). If the social risk score that is associated with the social entity exceeds the social risk threshold that is associated with the user 106, the security analysis engine may initiate an appropriate security action (213). If, however, the social risk score that is associated with the social entity does not exceed the social risk threshold that is associated with the user 106, the security analysis engine may instead take no action.

If the social entity is an unknown entity, the security analysis engine 101 may analyze characteristics of the social entity, and/or of a target URL, file, or social communication that is associated with the social entity (205), in order to determine a social risk score (207). The security analysis engine 101 may generate an entry in the social risk database 104 that contains both the social risk score and one or more characteristics of the social entity and/or the target. The security analysis engine 101 may then compare the social risk score that is associated with the social entity to a social risk threshold that is associated with the user 106 (209), and may determine whether the social risk score exceeds the social risk threshold (211). If the social risk score that is associated with the social entity exceeds the social risk threshold that is associated with the user 106, the security analysis engine may initiate an appropriate security action (213). If, however, the social risk score that is associated with the social entity does not exceed the social risk threshold that is associated with the user 106, the security analysis engine may instead take no action.

Figure 3:
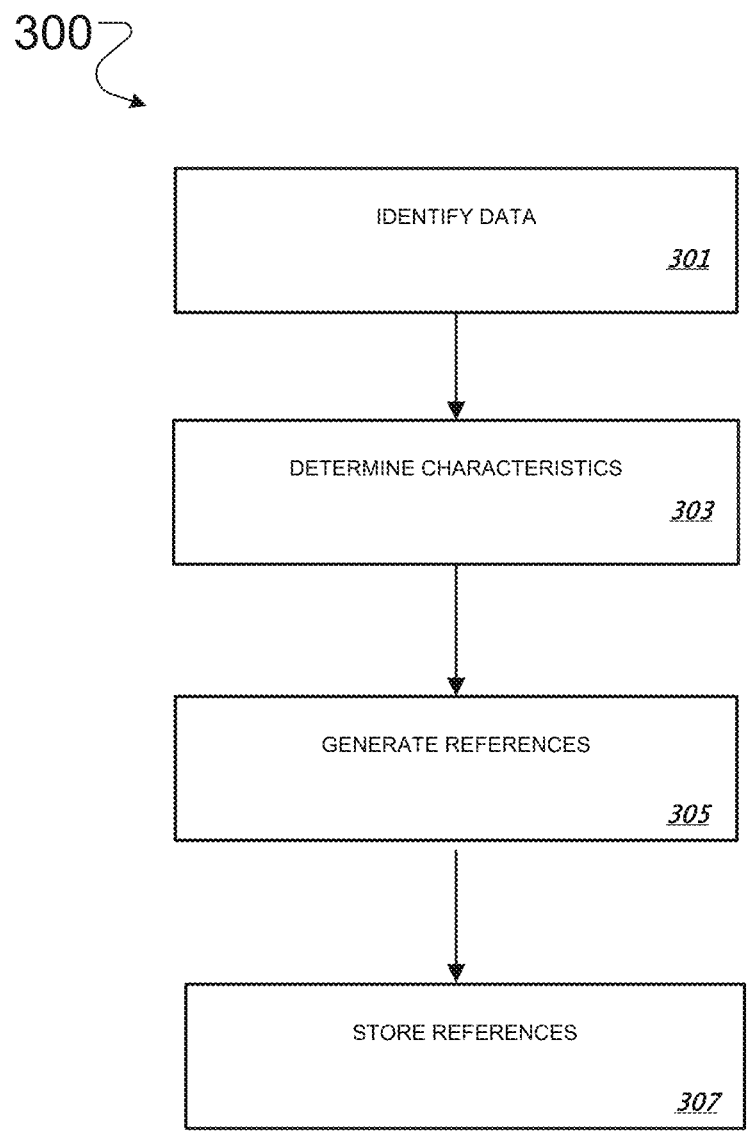
FIG. 3 is a flowchart of an example process for identifying data in a social network that is associated with a social entity.

FIG. 3 is a flowchart of a process 300 for identifying data in a social network that is associated with a social entity. The process 300 may be implemented, for example, using system 100, although other systems or configurations may be used. In such an implementation, one or more parts of the process may be executed by security analysis engine 101. In such an implementation, one or more parts of the process may be executed by security analysis engine 101, which may interface with other computers through a network. Security analysis engine 101 may identify and retrieve data involved in the process, such as data that is associated with a social entity, from one or more local or remote data sources, such as social network 105. Security analysis engine 101 may store data identified and retrieve in the process in one or more local or remote databases, such as social risk database 104. In some implementations, the user analysis engine 109 may identify and retrieve data involved in the process.

The security analysis engine 101 may be configured to actively scan one or more social networks for data that is available and that pertains to a social entity, and may be further configured to receive additional data that is available from other sources. In some implementations, the active scanning of the one or more social networks for data may be implemented by the user analysis engine 109.

A social entity may be, in some instances, a user of a social network, such as an individual or a corporation. John Doe, for example, may maintain a Facebook profile, in which case John Doe would be identified by security analysis engine 101 as a social entity, and information that is available through John Doe's profile, including pictures, textual content, posts, and links, would be associated with John Doe. Similarly, if Acme, Inc., maker of fine widgets, maintains a Twitter account for purposes of public relations, Acme, Inc. would be identified by security analysis engine 101 as a social entity, and information tweeted by representatives of Acme, Inc. could be associated with both Acme, Inc. and its representatives. In some instances, however, a social entity may be an individual who has generated a fake profile page spoofing another social entity. For example, a malicious individual or bot could establish a second, fake, Acme, Inc. Twitter profile but, having been identified as a fake, the profile would be associated with the social entity that is the malicious individual or bot, rather than with Acme, Inc. In other instances, the social entity may be a software application that runs automated tasks in relation to a social network. A social network may harbor, for example, a malicious bot that is configured to maintain a social network profile for purposes of phishing user data, or spreading computer viruses. The malicious bot would also be identified by security analysis engine 101 as a social entity, and information on or related to the malicious bot's profile would be associated with the malicious bot.

Data that is identified by security analysis engine 101 through the process of scanning a social network may include, for example, information that is available through a social entity's profile, information that is available to security analysis engine 101 by virtue of an agreement with the social entity, and information that is provided to security analysis engine 101 by the social network or by another third party. A hyperlink that is associated with a social entity, for example, may be identified through the social entity's profile if the profile contains a reference to the hyperlink. The hyperlink may also be identified through a social network communication, such as a message, post, or tweet, if the social network communication is a source of the hyperlink.

The security analysis engine 101 may be further configured to determine one or more characteristics of identified data. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. Security analysis engine 101 may generate references to identified data, and to characteristics of identified data. Once generated, the references may be stored in, for example, social risk database, for later use by the security analysis engine 101. The stored references may be used, for example, to evaluate and score a risk posed by a social entity.

Process 300 begins when a scanner identifies data on one or more social networks that is associated with a social entity (301). The scanner may be hosted at an entity that is different and separate from the security analysis engine 101. Alternatively, the scanner may be part of, or otherwise associated with, the security analysis engine 101, and may be integrated into the system 100 illustrated in FIG. 1.

Security analysis engine 101 may, for example, actively scan social networks for publicly or authorized available information. Security analysis engine 101 may additionally identify information that is associated with a social entity and that is received through an application programming interface (API). The type of data that is scanned from social networks may vary depending on the social network. For some social networks, security analysis engine 101 may only have access to publicly available information, in which case the scan of the social network would be limited to identifying and/or acquiring this publicly available data. Other social networks may instead recognize security analysis engine 101 as an authorized user (or as otherwise having elevated security status), and may therefore provide security analysis engine 101 with access to additional information that is not available to the general public. The different social networks may contain different types of data associated with a user profile. The security analysis engine 101 accesses each social network for only data that is available for that network. The security analysis engine 101 would not request data from a social network that is not maintained by the social network. For example, the security analysis engine may scan a LinkedIn profile, instead of a Twitter profile, for employment information.

Security analysis engine 101 may be configured to scan for only a subset of the data that is available on or through a social network. Scanning may be limited, for example, to popular pages or user profiles on a social network, such as popular Facebook profiles, and/or popular Twitter hash tags. Security analysis engine 101 may also be configured to scan social networks for any information associated with a particular individual, enterprise, or company. Security analysis engine 101 may, for example, be configured to scan the LinkedIn profiles of all employees of Acme, Inc. In some implementations, the system may constantly scan one or more social networks for data. In other implementations, the system may only scan during a set time period.

The security analysis engine 101 may determine one or more characteristics of identified data (303). Characteristics that may be determined for identified data may vary depending on the type of data. Identified data that is associated with a social entity may include, for example, the social entity's user name, history, contacts, and associated links and content. For an individual, the identified data may also include demographic information such as age, gender, location, and place of employment. Characteristics of a post may include, for example, language, timestamp, URL, domain or other information and metadata.

In some instances, identified data may include data that is correlated. Audio/visual (A/V) content data and textual data may, for example, be correlated in an instance in which the text describes the A/V data. In another example, content data may be a URL to a link the text data may include a user profile that is associated with the link. For example, the identified data may include a link to the Acme, Inc. website that was posted by John Doe, an avid fan or detractor of Acme, Inc. In this example, the posted content or the link to the Acme, Inc. website may be determined to be characteristics of the identified data, in addition to characteristics that include correlations between data identified from John Doe's profile.

Following determination of the characteristics of the identified data, security analysis engine 101 may generate, for each of the one or more characteristics, a reference to the characteristic or to the identified data to which the characteristic pertains (305). Security analysis engine 101 may, for instance, create a reference to a characteristic by tagging the characteristic. The characteristic may be tagged, for example, with a keyword or term that describes the characteristic.

Security analysis engine 101 may store references to identified data in one or more databases for later analysis (307). References to identified data that is associated with a social entity may be stored, for example, in social risk database 104, and may later be accessed to generate a social risk score for the social entity. Storage of references to identified data rather than the identified data itself may minimize the amount of memory needed to assess and to act on risks posed by social entities. In some implementations, however, both references to identified data and the identified data itself may be stored. In some implementations, all references to the one or more characteristics of the identified data associated with the social entity are stored while, in others, only a select group of references are stored.

Figure 4:
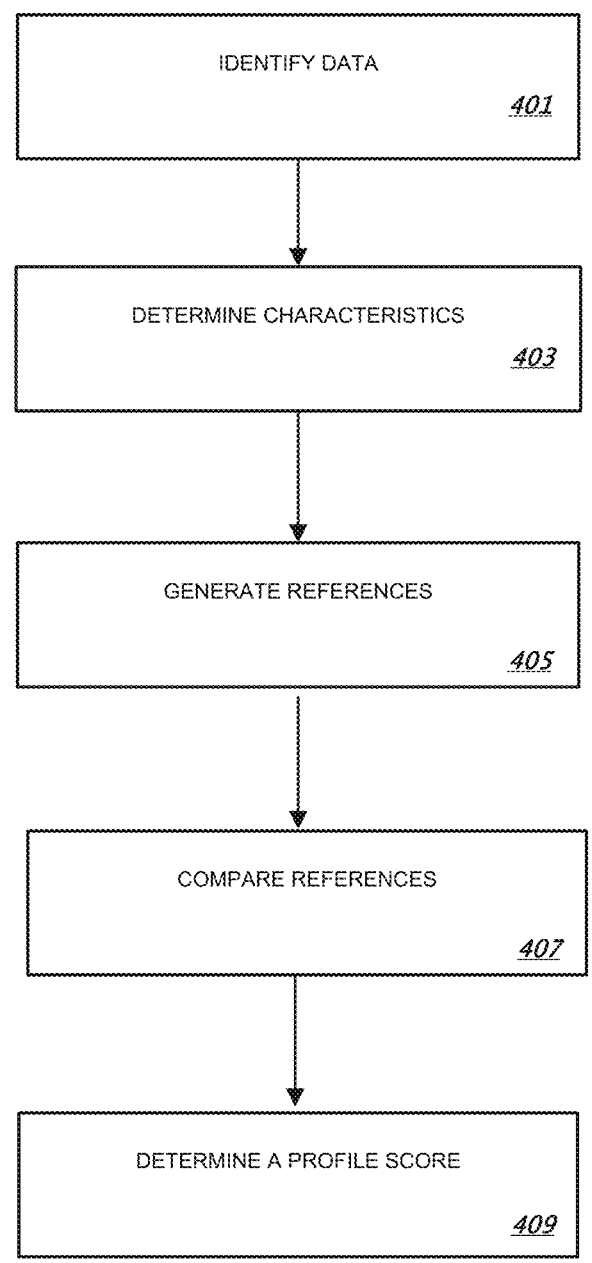
FIG. 4 is a flowchart of an example process for determining a profile score for a suspect social entity.

FIG. 4 is a flowchart of a process 400 for determining a profile score for a suspect social entity. The process 400 may be implemented, for example, using system 100, although other systems or configurations may be used. In such an implementation, one or more parts of the process may be executed by security analysis engine 101, which may interface with other computers through a network. In some implementations, the process may be executed by the security analysis in combination with user analysis engine 109. The user analysis engine 109 may be configured to identify social entities on a social network that are suspected of impersonating a protected social entity, which may be an individual or an organization. The user analysis engine 109 may identify imposters by determining profile scores that are associated with suspect social entities and by comparing the profile scores with a threshold profile score. The profile score for a particular suspect social entity may be determined based on a comparison of data that is associated with the suspect social entity to data that is associated with a protected social entity.

In more detail, the user analysis engine 109 may scan a protected social entity's profile on a social network for identifying information that may be unique to the protected social entity. The user analysis engine 109 may, for example, scan the protected entity's profile page for data including a profile picture, name, date of birth, place of employment, education, and location, etc. The user analysis engine 109 may then actively scan one or more social networks to identify social entities that may be impersonating the protected social entity. The user analysis engine 109 may identify an impersonating social entity by assessing how similar data that is associated with a suspect social entity is to the data that is associated with the protected social entity.

A protected social entity may be an individual who seeks protection from a social threat protection tool, such as user analysis engine 109. Jane Roe, for example, may seek to protect her personal account from suspect social entities that may attempt to use her personal information to generate one or more fraudulent accounts on social media websites. In some examples, a protected social entity may be an enterprise or a company, Acme Inc., for example, may be a social entity that seeks to protect its corporate profiles on social websites, and to monitor other social entities on social websites that claim to be employed or otherwise affiliated with Acme, Inc.

A suspect social entity that is an imposter may generate and maintain fraudulent profiles that impersonate accounts of other social entities on social media websites. A fraudulent profile may be generated and maintained by an individual. For example, John Doe may impersonate Jane Roe by generating a fake profile page for Jane Roe on LinkedIn, using an image of Jane obtained from the Internet, unbeknownst to Jane Ford herself. In other examples, one or more a fraudulent profiles may be generated and maintained by a malicious bot on a social media website. A suspect social entity may be a social entity that is potentially associated with a fraudulent social network profile or account. A suspect social entity may also be a social entity that potentially falsely claims to be affiliated with an enterprise or association. John Doe, for example, may falsely list ZeroFox as an employer. A suspect social entity may generate an imposter profile of a protected social entity on a social network. The imposter profile may include the exact information from the real profile page of the protected social entity. For example, the imposter profile may include the protected social entity's profile picture, date of birth, location, place of employment and any other additional profile information.

In some instances, an imposter profile may not initially post any malicious malware on behalf of the protected social entity, or otherwise perform actions that would themselves constitute threats to computer security. In these instances, the imposter may simply impersonate the protected entity through a social profile and messaging, and through that impersonation may connect with followers of the genuine protected social entity. Through this behavior, the imposter may misrepresent positions of the protected social entity or otherwise damage its interests and reputation. Moreover, the impersonator may exploit the trust of the protected social entity's followers by later engaging in malicious behavior that targets the followers.

The user analysis engine 109 may be configured to take security actions in response to the identification of a fraudulent profile. User analysis engine 109 may, for example, flag identified fraudulent profiles that have been generated to impersonate the profile of a protected social entity. The flagged fraudulent profiles may also be monitored to identify any malicious actions. A fraudulent profile may, for example, be maintained on a "watch list" of social media profiles that should be monitored for malicious acts. The fraudulent profile may be an imposter of a protected social entity. The imposter may or may not post malicious content on behalf of the protected security. The security analysis engine may identity any imposters of the protected social entity. A protected social entity may be alerted to posts or other actions carried out by suspect social entities that have been identified as impersonators of the protected social entity. For example, if malware is posted to a fraudulent LinkedIn page run by a social entity that is impersonating Jane Roe, Jane may be alerted of the action. Similarly, if Acme, Inc. is a protected social entity, Acme, Inc. may receive alerts if a fraudulent profile distributes malware in the company's name.

Process 400 begins when a scanner identifies data on one or more social networks that is associated with a suspect social entity (401). The scanner may be hosted at an entity that is different and separate from the security analysis engine 101. Alternatively, the scanner may be part of, or otherwise associated with, the security analysis engine 101, and may be integrated into the system 100 illustrated in FIG. 1. In some implementations, the process may be executed by the user analysis engine 109.

Security analysis engine 101 may actively scan social networks for publicly available information, and/or information that is available to security analysis engine 101 by special authorization. As described earlier, the type of data that is scanned from social networks may vary depending on the social network. For some social networks, security analysis engine 101 may only have access to publicly available information, in which case the scan of the social network would be limited to identifying and/or acquiring this publicly available data. Other social networks may instead recognize security analysis engine 101 as an authorized user (or as otherwise having an elevated security status), and may therefore provide security analysis engine 101 with access to additional information that is not available to the general public.

The security analysis engine 101 may determine one or more characteristics of identified data (403). Characteristics that may be determined for the identified data may vary depending on the type of data identified. Identified data that is associated with a suspect social entity may include, for example, the suspect social entity's user name, profile picture, date of birth, gender, location, email address, education, and organization. The identified data associated with the suspect social entity may also include data about the friends, followers or connections of the suspect social entity. In some implementations, the security analysis engine may determine a rating for the friends or followers of a suspect entity. In these implementations, the profile score of the social entity may be affected by the rating determined for the friends or followers of the social entity. For example, the security analysis may rate the friends or followers of an entity as high risk, based on a large number of the friends or following being associated with malicious acts.

Following a determination of the characteristics of the identified data, security analysis engine 101 may generate, for each of the one or more characteristics, a reference to the characteristic or to the identified data to which the characteristic pertains (405). Security analysis engine 101 may, for instance, create a reference to a characteristic by tagging the characteristic. The characteristic may be tagged, for example, with a keyword or term that describes the characteristic.

References to characteristics of identified data that is associated with a protected social entity may be generated when the security analysis engine 101 scans social websites. The security analysis engine 101 may scan a protected social entity's profile, for example, for data including the protected social entity's user name, profile picture, date of birth, gender, location, email address, education, and organization. In some examples, the protected social entity may provide additional images other than the entity's current profile picture. In these examples, the security analysis engine 101 may store a reference to the additional images. When the protected social entity is a popular individual or celebrity, the security analysis engine 101 may acquire additional images from websites such as Wikipedia, and store references to these images. In some other examples, the protected social entity may be an enterprise or company that seeks to protect the use of an emblem or logo that is associated with the enterprise or company. The security analysis engine 101 may, in these examples, store references to images that are associated with the company.

The security analysis engine 101 may store the references to the identified data in a database. Storage of references to identified data rather than the identified data itself may minimize the amount of memory needed to assess and to act on risks posed by social entities. In some implementations, however, both references to identified data and the identified data itself may be stored. In some implementations, all references to the one or more characteristics of the identified data associated with the protected social entity are stored while, in others, only a select group of references are stored.

The security analysis engine 101 may compare one or more generated references to one or more stored references (407). In some implementations, the process may be executed by the user analysis engine 109. The user analysis engine 109 may store one or more references to characteristics of identified data associated with a protected social entity.

The user analysis engine 101 may use one or more techniques to compare generated references to identified data that is associated with a suspect social entity, to stored references to identified data that is associated with a protected social entity. The user analysis engine may compare images obtained from websites such as Wikipedia to compare to the image of the suspect social entity. The user analysis engine 109 may derive data from an image by hashing the image. The user analysis engine 109 may, for example, generate a reference to an image that is associated with a suspect social entity by deriving data from the image, and may compare the derived data with data derived from an image that is associated with a protected social entity. The user analysis engine 109 may, for example, hash an image that is associated with the suspect social entity, and may compare the hashed image with a hash of an image that is associated with a protected social entity. Through this method or by other techniques, the user analysis engine 109 may be able to detect if an image associated with a protected social entity is being used by an imposter. The user analysis engine 101 may also use facial recognition to identify individuals in images and to generate references. The facial recognition process that is executed on images can be used to recognize various characteristics of individuals in the images, including facial structure or gender.

In some implementations, the user analysis engine 109 may determine a match score for each comparison that occurs between references to characteristics associated with the protected social entity and references to characteristics associated with the suspect social entity. The user analysis engine 109 may then determine an overall profile score of a suspect social entity based on an average of the match scores of each comparison. The user analysis engine 109 may, for example, determine a match score based on a comparison of references to a name field of a protected social entity and one or more suspect social entities. The user analysis engine 109 may determine a high match score for suspect entities that have variations of the name of the protected social entity. For example, suspect entities Mike Hall, Micky Hall, Mic Hall, Mik Hall, Mick Hall, Michael H, and M Hall may be assigned a high match score for the protected social entity Michael Hall.

The user analysis engine 109 may also compare a reference to a location of a protected social entity to a reference of the location of a suspect entity. In some implementations, the location of a suspect social entity may be identified from demographic information listed on the profile page of the suspect social entity.

Following comparison of references, the user analysis engine 109 may determine a profile score of the suspected social entity (409). The profile score is a quantifiable rating that measures how closely a suspect social entity matches a protected social entity. In some implementations, the user analysis engine 109 may calculate a match score for each reference that is compared between the protected social entity and the suspect social entity. In these implementations, the profile score may be determined as the average of the match scores. In other implementations, the profile score may be determined using a different algorithm. The profile score may, for example, be determined as a weighted average of a comparison of the references between the protected social entity and the suspect social entity. A comparison of a reference to an image, for instance, may be more heavily weighted than that of a reference to the location, which may in turn be more heavily weighted than a reference to a date of birth.

Figure 5:
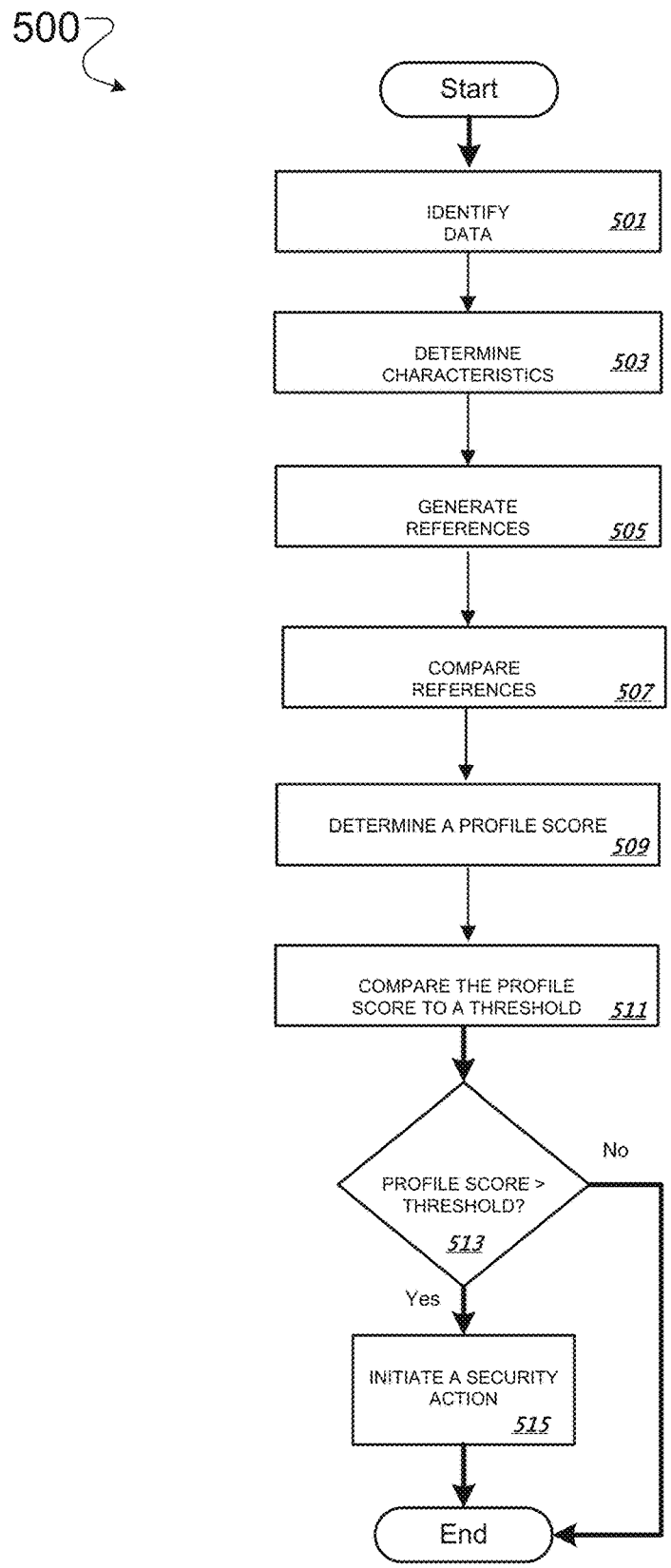
FIG. 5 is a flowchart of an example process for determining a profile score for a suspect social entity, and for initiating a security action based on the determined profile score.

FIG. 5 is a flowchart of an example process 500 for determining a profile score for a suspect social entity, and for initiating a security action based on the determined profile score. The process 500 may be implemented, for example, using system 100, although other systems or configurations may be used. In such an implementation, one or more parts of the process may be executed by security analysis engine 101, which may interface with other computers through a network. In some implementations, the process may be executed by the user analysis engine 109.

Process 500 begins when a scanner identifies data on one or more social networks that is associated with a suspect social entity (501). The scanner may be hosted at an entity that is different and separate from the user analysis engine 109. Alternatively, the scanner may be part of, or otherwise associated with, the user analysis engine 101, and may be integrated into the system 100 illustrated in FIG. 1.

The user analysis engine 109 may determine one or more characteristics of identified data (503). Characteristics that may be determined for identified data may vary depending on the type of data identified. Identified data that is associated with a suspect social entity may include, for example, the suspect social entity's user name, the suspect social entity's profile picture, date of birth, gender, location, email address, education, and organization.

Following a determination of the characteristics of the identified data, user analysis engine 109 may generate, for each of the one or more characteristics, a reference to the characteristic or to the identified data to which the characteristic pertains (505). User analysis engine 109 may, for instance, create a reference to a characteristic by tagging the characteristic. The characteristic may be tagged, for example, with a keyword or term that describes the characteristic.

The user analysis engine 109 may compare one or more generated references to one or more stored references (507). The user analysis engine 109 may store one or more references to characteristics of identified data associated with a protected social entity. The user analysis engine 109 may use one or more different techniques to compare the generated references associated with the suspect social entity to the stored references associated with the protected social entity.

Following the comparison of the references, the user analysis engine 109 may determine a profile score of the suspected social entity (509). The profile score is a quantifiable rating that measures how closely there is a match to the protected social entity, that is, how likely the suspect social entity may be considered as an entity attempting to impersonate the protected social entity.

The user analysis engine 109 may compare a profile score that is associated with the suspect entity to a profile score threshold (511), and may determine whether the profile score exceeds the profile score threshold (513). If a profile score that is associated with the social entity exceeds a profile score threshold, the security analysis engine may initiate a security action (515). If, however, the profile score that is associated with the suspect social entity does not exceed the threshold profile score, the security analysis engine may instead take no action. In some implementations, initiating a security action may include generating an alert and proving the generated alert to the protected social entity. For example, Clark Kent may receive an alert describing Clarke Kent as a suspect social entity that is an imposter. In some implementations, the alert may be a web-based alert. The alert may also be received as an email, or as a text message on a mobile device of the protected social entity. In other implementations, the protected social entity may be provided with visual alerts through a social threat protection tool that identifies suspect social entities.

Figure 6:
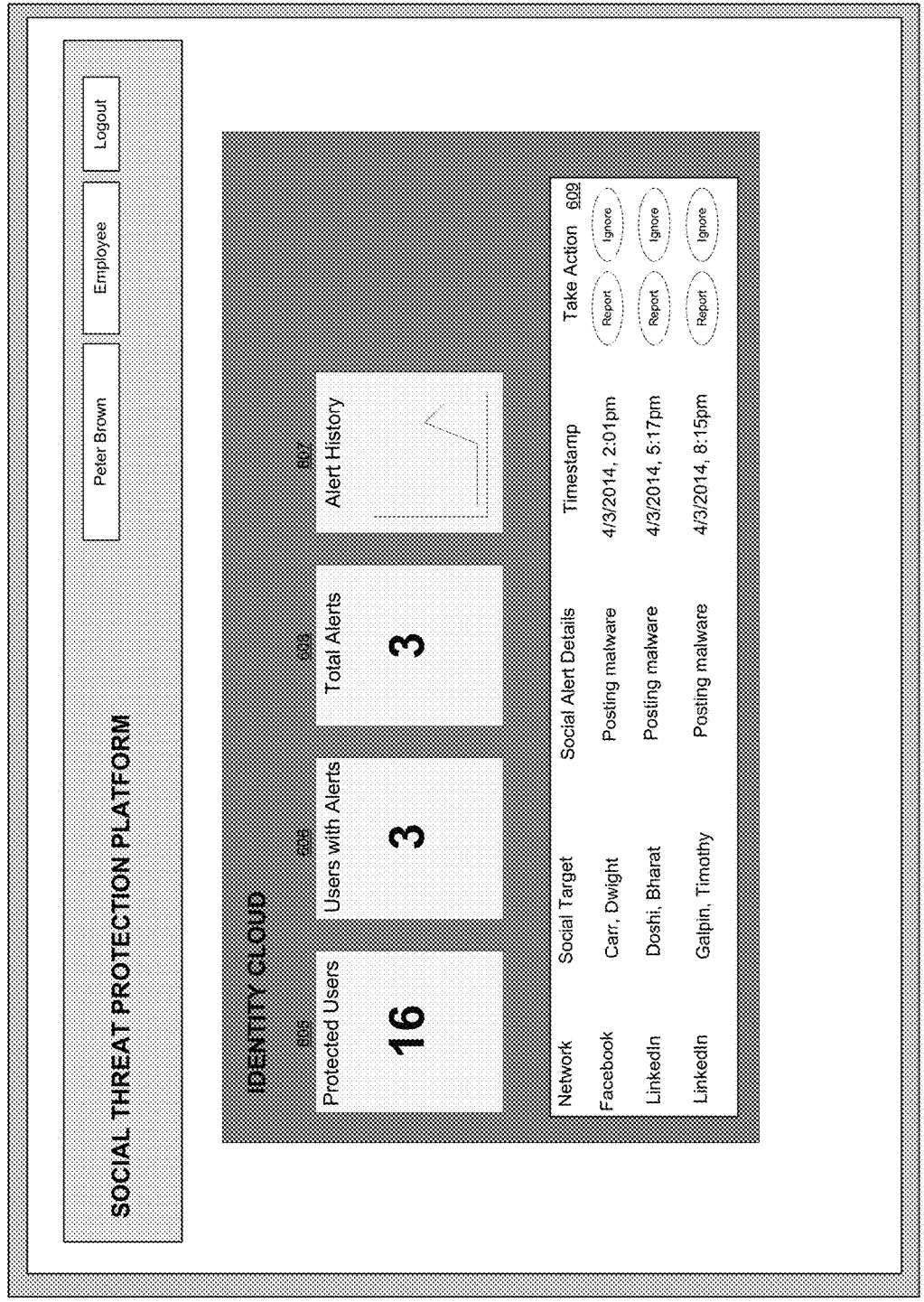
FIGS. 6-8 are illustrations of a social threat protection platform.
Figure 7:
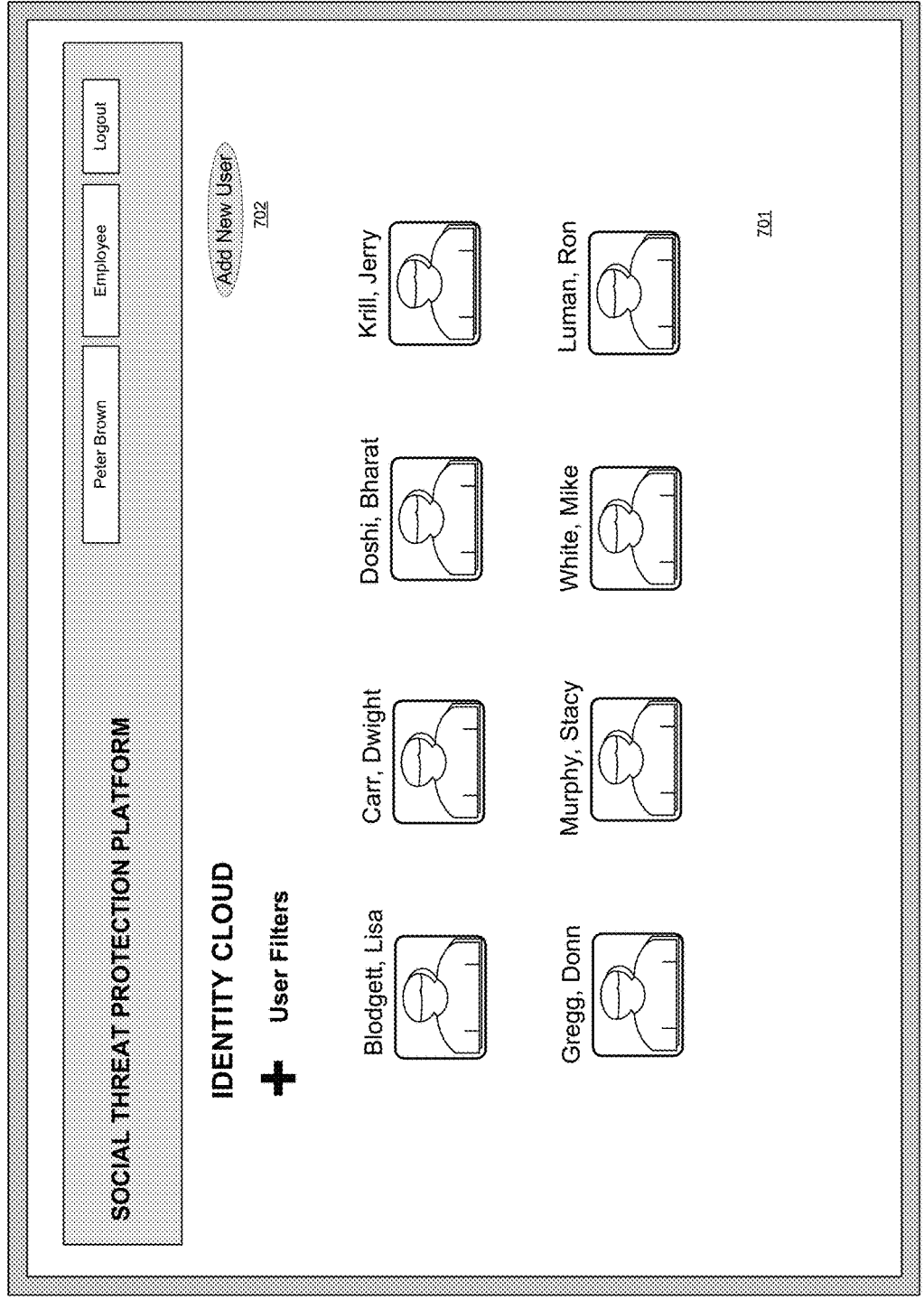
Figure 8:
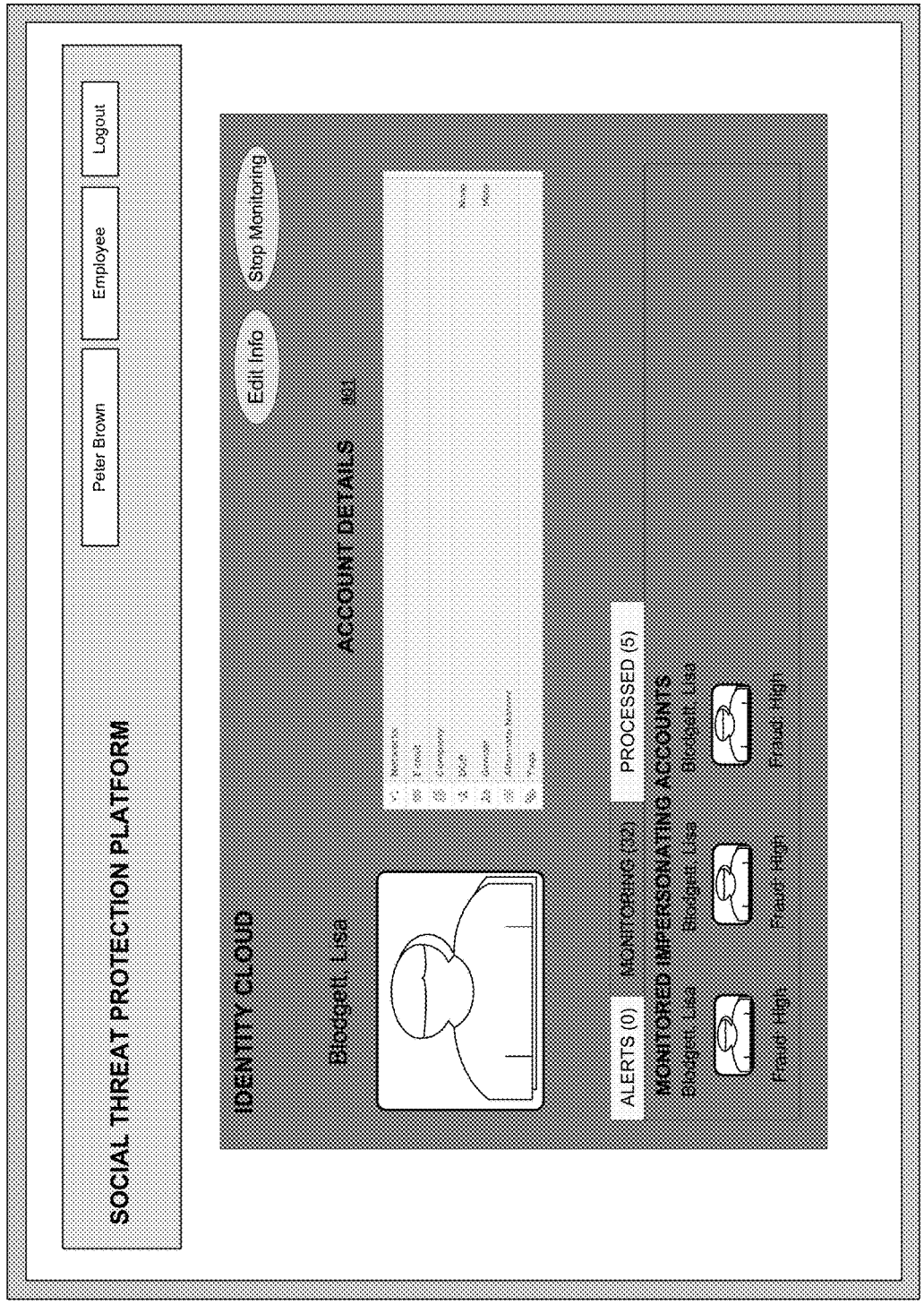

FIGS. 6, 7, and 8 are example illustrations of a social threat protection platform. The illustrated user interfaces may be displayed, for example, when an administrator of a social threat protection tool logs into the platform.

As FIG. 6 illustrates, the social threat protection platform may have one or more applications. The screenshot illustrated in FIG. 6 shows the identity page of the social threat protection tool platform. The identity page may include a number of protected users (605) that subscribe to and are protected by the social threat protection tool. The identity page may also include a number of users of the social threat protection tool that have active alerts (606), in addition to an alert history graph (607). The identity page may also include a list of the users with active alerts (608). For users with active alerts, the identity page may provide details associated with the listed alerts. The identity page may, for example, identify an imposter account that is associated with a user and that may be posting malware. The listing of alerts may also include an option for the user to ignore the alert or take an action (609).

FIG. 7 may be displayed when the administrator user selects the protected users icon 605 illustrated in FIG. 6. When selected, the social threat may full listing of protected users 701 of the social threat protection tool. The listing of protected users may include the number of alerts for each protected user, the number of imposter profiles that may be detected for each protected user and the number of processed alerts. The administrator user may have the ability to select an individual user to further observe the user's account, as illustrated in FIG. 8. The administrator user may also have the ability of adding a new user by selecting the "add new user" icon 702.

FIG. 8 may be displayed when the administrator user selects an individual user to further observe a user's account. The administrator user may then be able to view the selected user's account information details 801. The account information details that are displayed may include the user's name, date of birth, company, gender, alternate names, and any other account information stored at the databases associated with the social threat protection tool. The account information displayed may be information that was provided to the social threat protection tool by the user. In other implementations, the account information displayed may be information identified when the security analysis engine 101 associated with the social threat protection tool scans one or more social network profiles associated with the protected user. The account details may further include any images associated with the user. The user details page may also include the list of accounts that have been identified as impersonating the user as well as a list of the impersonating accounts that are being monitored and the list of impersonating accounts that have been processed. In some implementations, the user details may include the profile score associated with each impersonating account.

Figure 9:
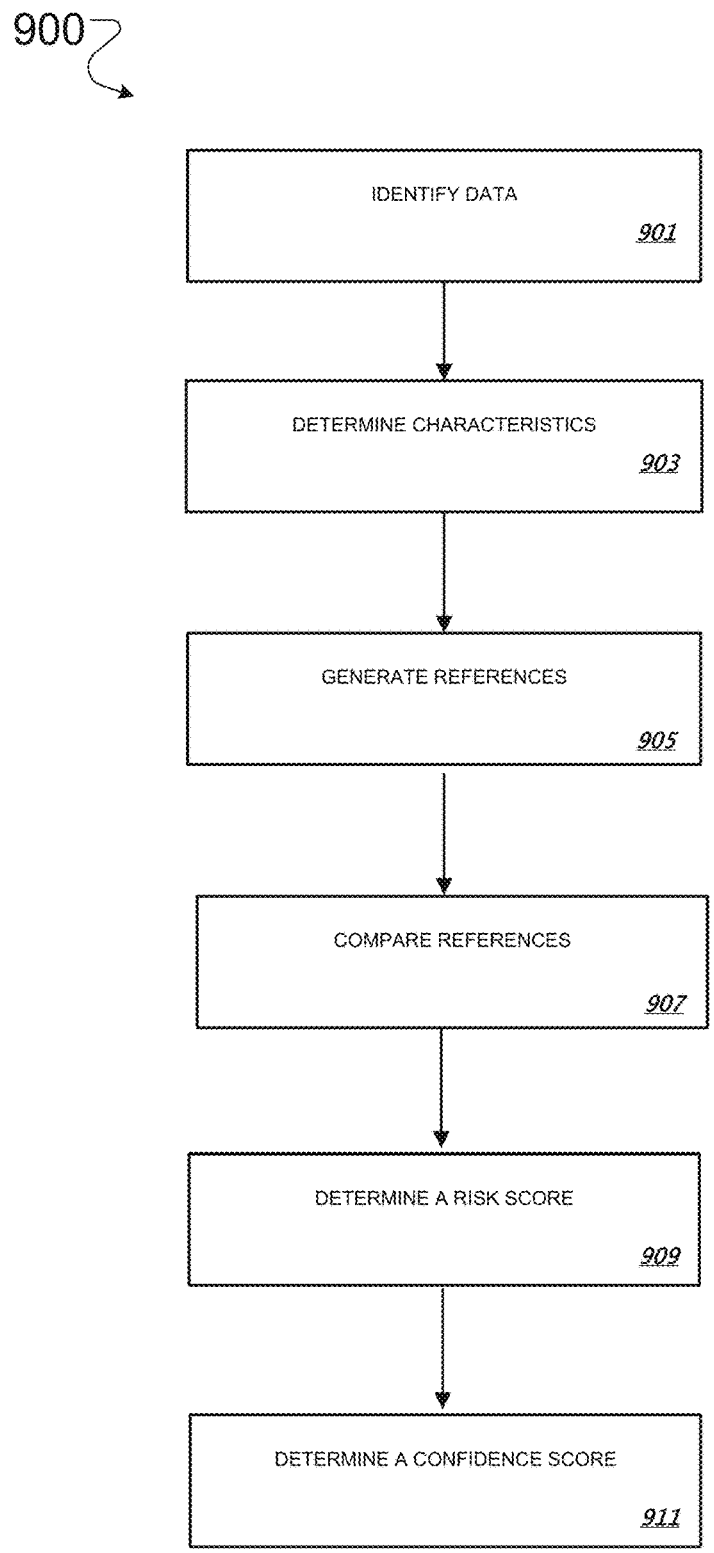
FIG. 9 is a flowchart of an example process for determining risk score for a social entity, and for determining a confidence score for the risk score.

FIG. 9 is a flowchart of an example process for determining risk score for a social entity, and for determining a confidence score for the risk score. The process 900 may be implemented, for example, using system 100, although other systems or configurations may be used. In such an implementation, one or more parts of the process may be executed by security analysis engine 101, which may interface with other computers through a network. In some implementations, the process may be executed by the user analysis engine 109, which may be included within the security analysis engine 101.

The user analysis engine 109 may determine a risk score for a social entity. A risk score is an estimation of a security risk posed by a social entity, and is related to characteristics of data associated with the social entity. Data may, for example, be generated as a result of actions and postings of the social entity on one or more social networks, and the risk score may provide an estimate of a security risk based on characteristics of the generated data.

The user analysis engine 109 may determine a confidence score for a risk score that is associated with a social entity, the confidence score indicating a level of confidence in the risk score's accuracy. The confidence score may, for example, be statistically determined based on the risk score.

The user analysis engine may execute incremental retrains on sets of data identified on social networks, the incremental retrains enabling the user analysis engine to continually update data sets that are used to determine risk scores, and to thereby enhance confidence in the determined risk scores. The user analysis engine may, for example, determine a first risk score for a social entity using a first data set, but may determine a confidence score for that first risk score that falls below a confidence threshold. The user analysis engine may then, at a set time or in response to the determination that the confidence score was below the threshold, scan one or more social networks to identify additional data related to the social entity that can be used to supplement the first data set that was used to determine the social entity's first risk score. The user analysis engine may then, based on the supplemented data set, determine a second risk score for the social entity, and may also statistically determine a confidence score for the second risk score.

Retraining data sets in this and other ways allows the user analysis engine to reevaluate risks associated with social entities on a real-time basis. The retraining process may, for example, allow the user analysis engine to determine a risk score based on the latest available data that is associated with an entity. By combining the determination of confidence scores with incremental retraining, the user analysis engine is able to provide, with ever increasing accuracy, current risk scores for social entities.

In more detail, the user analysis engine 109 may actively scan one or more social networks for available data pertaining to a social entity and may generate risk scores for the social entity through analysis of data by scans. As one example of data that may be acquired through social network scanning, a hyperlink that is associated with a social entity may be identified through the social entity's profile if the profile contains a reference to the hyperlink. A hyperlink may also be identified through a social network communication, such as a message, post, or tweet, if the social network communication includes the hyperlink.

The user analysis engine 109 may also be configured to receive additional data that is available from other sources. Data that is identified by the user analysis engine 109 through the process of scanning a social network may include, for example, information that is available through a social entity's profile, but a data set built by the user analysis engine 109 may also include information that is provided to the user analysis engine 109 by a third party, such as the operator of the social network.

The security analysis engine 101 may be further configured to determine one or more characteristics of identified data. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. The characteristics are indicative of the data related to the social entity and the activities of the social entity. User analysis engine 109 may generate references to identified data, and to characteristics of identified data.

The risk score for a social entity may be determined by comparing characteristics of data that is newly identified as relating to the social entity to characteristics of previously analyzed data, such as known activities or postings of the social entity. As a result of previous analysis, the user analysis engine may have already determined a risk score indicating a risk level associated with characteristics of the known data, and the user analysis engine 109 may revise the risk score for the social entity based on characteristics of the newly identified data. In some implementations, the known characteristics of data may be characteristics of data analyzed by an external third party.

Process 900 begins when a scanner identifies data on one or more social networks that is associated with a social entity (901). The scanner may be hosted at an entity that is different and separate from the security analysis engine 101. Alternatively, the scanner may be part of, or otherwise associated with, the security analysis engine 101, and may be integrated into the system 100 illustrated in FIG. 1. In some implementations, the process may be executed by the user analysis engine 109.

Security analysis engine 101 may actively scan social networks for publicly available information, and/or information that is available to security analysis engine 101 by special authorization. The type of data that is scanned from social networks may vary depending on the social network. For some social networks, security analysis engine 101 may only have access to publicly available information, in which case the scan of the social network would be limited to identifying and/or acquiring this publicly available data. Other social networks may instead recognize security analysis engine 101 as an authorized user (or as otherwise having an elevated security status), and may therefore provide security analysis engine 101 with access to additional information that is not available to the general public.

The security analysis engine 101 may determine one or more characteristics of identified data (903). Characteristics that may be determined for the identified data may vary depending on the type of data identified. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. The characteristics are indicative of the data related to the social entity and the activities of the social entity. User analysis engine 109 may generate references to identified data, and to characteristics of identified data.

Following a determination of the characteristics of the identified data, security analysis engine 101 may generate, for each of the one or more characteristics, a reference to the characteristic or to the identified data to which the characteristic pertains (905). Security analysis engine 101 may, for instance, create a reference to a characteristic by tagging the characteristic. The characteristic may be tagged, for example, with a keyword or term that describes the characteristic.

References to characteristics of identified data that is associated with a social entity may be generated when the security analysis engine 101 scans one or more social networks. The security analysis engine 101 may scan the profiles of social entities, for example, for characteristics of data including contextual, lexical, visual, audio, profile, URL, file, network, destination content, domain, host, and application data. The security analysis engine 101 may also scan the profiles of social entities for data related to the actions of the social entities, for example, links posted by the entity, any communication between the entity and other entities, and hash tags used by the entity. The security analysis engine may also generate a reference to a determined geographic location of the servers where links, communications and/or malware on the profile of social entities may originate.

The security analysis engine 101 may compare one or more generated references to one or more known references (907). In some implementations, the process may be executed by the user analysis engine 109. The one or more known references may be references to characteristics of identified data that may have been previously analyzed and, as a result of the previous analysis, assigned a level of risk by the security analysis engine 101. In some implementations, the one or more known references may be references to data analyzed by an external third party. The one or more known references may include references to contextual, lexical, visual, audio, profile, URL, file, network, destination content, domain, host, and application characteristics.

The security analysis engine may continuously scan one or more social networks for data, and predict the level of risk associated with data related to the first detected occurrence of an action or a posting by a social entity. For example, the security analysis engine 101 may detect a malicious social entity posting a link to malware on the Facebook wall of one or more other social entities, and may determine that the level of risk associated with the link is high. The security analysis engine 101 may then determine that the level of risk for other characteristics of data that is identified as being associated with the malicious social entity is high. The other characteristics may include, for example, a user name of the malicious social entity and a URL associated with the malware link. The security analysis engine 101 may also detect a geographic location of a server from which the malware originated, and may determine that a level of risk associated with any additional data that originated at the same server is high. The security analysis engine 101 may store one or more references that are generated through this process and the determined risk level(s) associated with those references. The security analysis engine 101 may also compare the one or more generated references to one or more previously stored references to determine similarity of the characteristics of the data tagged by the references.

Following comparison of references, the security analysis engine 101 may determine a risk score of the social entity (909). The security analysis engine 101's determination may be driven by a scoring algorithm that can determine and score a risk posed by a social entity by analyzing references to characteristics of the data that is associated with the social entity. A variety of characteristics may be used by the scoring algorithm to analyze data that is associated with the social entity. In some implementations, the scoring algorithm weighs a contribution of different characteristics of data differently on a characteristic-by-characteristic basis. A URL that is associated with a link to malware may, for example, be weighted more heavily by the scoring algorithm than a geographic origin of the malware.

The scoring algorithm may utilize the comparison of one or more of the generated references to the one or more known references. In one implementation, a subset of the references to characteristics of data related to the social entity may be compared to one or more known references, and the subset of characteristics related to the social entity may be associated with the same risk score for the one or more known references, depending on the similarity of the data.

The security analysis engine 101 may determine a confidence score for the risk score (911). The confidence score may be statistically determined, and may be used to indicate the reliability of the determined risk score associated with the social entity. The security analysis engine 101 may, for example, utilize a statistical algorithm to determine a confidence score for the risk score. In some implementations, the statistical algorithm may determine a confidence score based on analysis of one or subsets of data identified as relating to the social entity. The security analysis engine 101 may also determine a confidence score for the risk score based on a comparison to a risk score determined by an external third party. The security analysis engine 101 may, for example, assign a high confidence score to a risk score that is similar to a risk score determined by the external third party.

The user analysis engine may also generate a normalized risk score for a social entity based on a determined risk score by mapping the determined risk score to a numerical range, such as 0-100. This normalized risk score may ultimately be displayed to a user.

Figure 10:
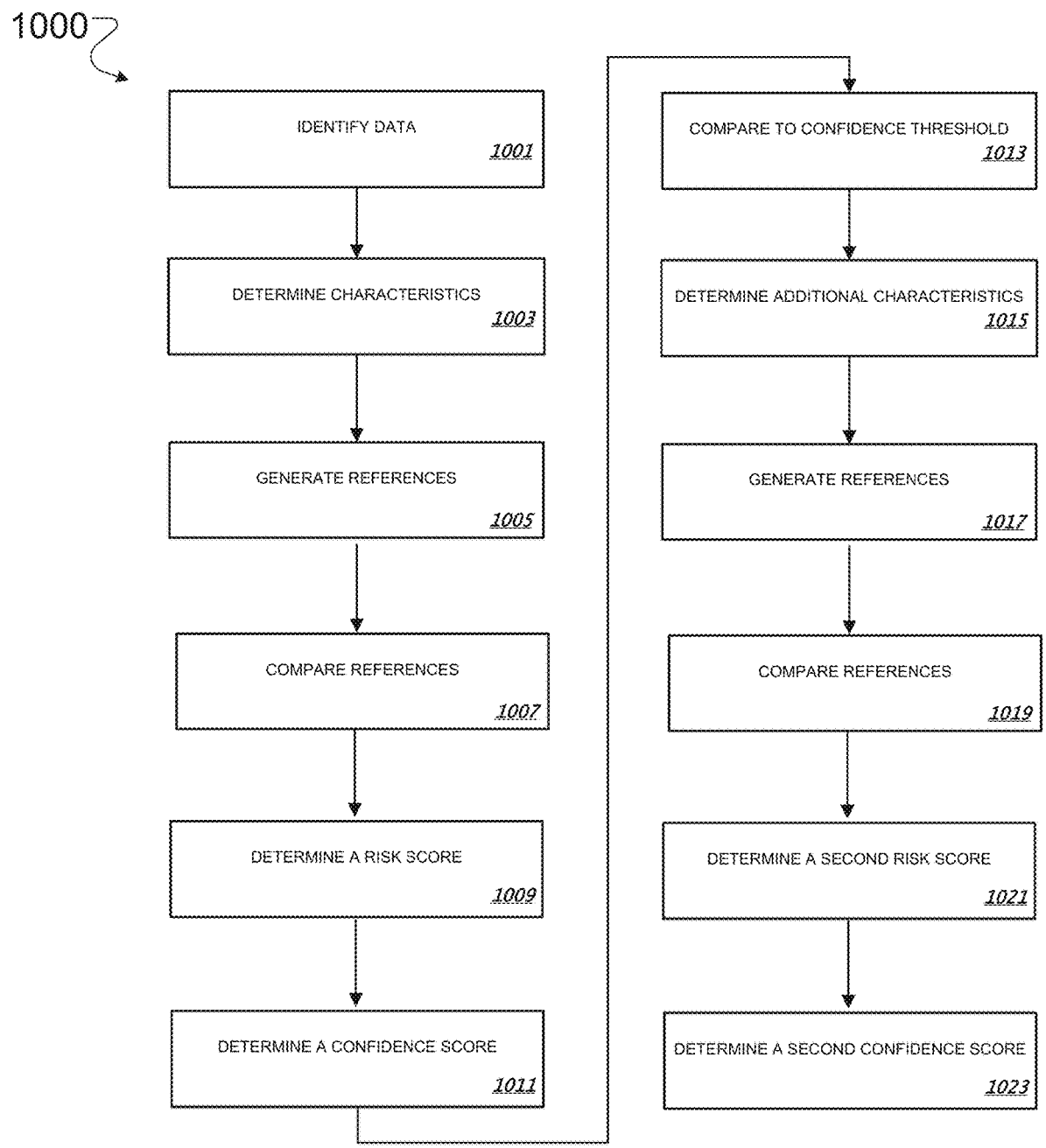
FIG. 10 is a flowchart of an example process for comparing a confidence score for a risk score of a social entity to a confidence threshold, for determining another risk score for the social entity, and for determining a confidence score for the other risk score.

FIG. 10 is a flowchart of a process 1000 for determining a second confidence score for a second risk score of a social entity. The process 1000 may be implemented, for example, using system 100, although other systems or configurations may be used. In such an implementation, one or more parts of the process may be executed by security analysis engine 101, which may interface with other computers through a network. In some implementations, the process may be executed by the user analysis engine 109.

Process 1000 begins when a scanner identifies data on one or more social networks that is associated with a social entity (1001). The scanner may be hosted at an entity that is different and separate from the security analysis engine 101. Alternatively, the scanner may be part of, or otherwise associated with, the security analysis engine 101, and may be integrated into the system 100 illustrated in FIG. 1. The scanner may, for example, be part of the user analysis engine 109.

The security analysis engine 101 may determine one or more characteristics of identified data (1003). Characteristics that may be determined for the identified data may vary depending on the type of data identified. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. Determined data characteristics may indicate activities of a social entity.

Following a determination of the characteristics of the identified data, security analysis engine 101 may generate, for each of the one or more characteristics, a reference to the characteristic or to the identified data to which the characteristic pertains (1005). Security analysis engine 101 may, for example, create a reference to a characteristic by tagging the characteristic. The characteristic may be tagged, for instance, with a keyword or term that describes the characteristic, and tag may be stored along with the characteristic in a database that is accessible to the security analysis engine 101.

The security analysis engine 101 may compare one or more generated references to one or more known references (1007). The one or more known references may be references to characteristics of identified data that may have been previously analyzed and assigned a level of risk by the security analysis engine 101. In some implementations, the one or more known references may be references to data analyzed by an external third party. The security analysis engine 101 may store one or more known references and a risk level associated with the stored references. The security analysis engine 101 may compare one or more generated references to one or more references that have previously been stored in order to determine similarity of tagged data characteristics.

The security analysis engine 101 may determine a risk score of the social entity (1009), and may use a comparison of references as part of the process of determining the risk score. The security analysis engine 101 may utilize a scoring algorithm that may determine and score a risk posed by a social entity by analyzing references to characteristics of data that is identified as associated with the social entity.

The security analysis engine 101 may determine a confidence score for the risk score (1011). The confidence score may be statistically determined, and may be used to indicate the reliability of the determined risk score associated with the social entity. The security analysis engine 101 may utilize a statistical algorithm to determine a confidence score for the risk score. In some implementations, the algorithm may determine a confidence score based on analysis of one or more subsets of data identified as relating to the social entity, and may, as part of the process of determining the confidence score for a current risk score, take into account previously determined risk scores, including risk scores provided by third parties.

The security analysis engine 101 may compare a determined confidence score to a confidence score threshold (1013). The confidence score threshold may vary depending on the type of data that was available to the security analysis engine 101 in determining the risk score for the social entity. Data that is recognized by the security analysis engine 101 as relating to phishing or malware may, for example, elicit a lowering of a confidence score threshold that is used to determine the reliability of a risk score.

If the confidence score of the risk score is below the confidence score threshold the security analysis engine 101 may refine the data set by determining one or more additional characteristics of the identified data (1015). The one or more additional characteristics may be characteristics that were identified in a previous scan of one or more social networks, or that were supplied by a third party. The security analysis engine 101 may also, in response to a determination that the confidence score is below the confidence score threshold, perform an additional scan one or more social networks to identify one or more additional characteristics of data related to the social entity.

The security analysis engine 101 may generate a reference for each of the one or more additional characteristics (1017). Security analysis engine 101 may, for instance, create a reference to a characteristic by tagging the characteristic, and may store the reference in a database that is accessible to the security analysis engine 101. A characteristic may be tagged, for example, with a keyword or term that describes the characteristic.

In implementations in which references for each of one or more additional characteristics are generated, the security analysis engine may compare the additional references to one or more known references (1019).

The security analysis engine may determine a second risk score (1021), and may determine a second confidence score for the second risk score (1023). The second confidence score may be statistically determined, and may be used to indicate the reliability of the second risk score.

Figure 11:
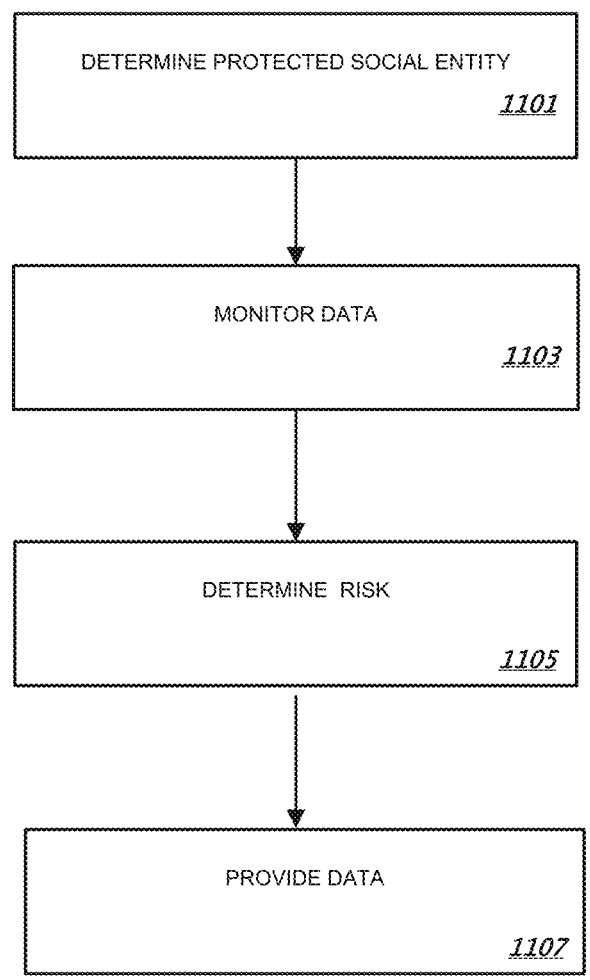
FIG. 11 is a flowchart of the process 1100 for providing risk management data to a user.

FIG. 11 is a flow chart of the process 1100 for providing risk management data to a user. The process 1100 may be implemented, for example, by one or more servers associated with the risk management platform, in conjunction with system 100, although other systems or configurations may be used. In such an implementation, one or more parts of the process may be executed by security analysis engine 101 and/or user analysis engine 109, which may interface with other computers through a network. The security analysis engine 101 and/or user analysis engine 109 may, for example, actively scan one or more social networks based on risk management account settings configured by users of the risk management platform, and servers associated with the risk management platform may host the resulting data.

In some implementations, the risk management platform may be implemented as a cloud-based application accessible through a web-based portal. In such an implementation, there may be no need for user to install software or hardware associated with the risk management platform. A user may access the risk management platform, for example, using a browser running on any suitable electronic device, such as a desktop computer, laptop, tablet, or smart phone.

The risk management platform may support subscriptions to one or more cyber-security applications and/or features. Users of the risk management platform may include individuals and/or organizations seeking to increase insight into risks posed by social entities and to lessen susceptibility to fraud, user impersonation, negative social engineering, and other malicious behaviors. Social entities protected by the risk management platform may include, for example, individuals who have registered accounts valid subscriptions to a risk management platform offering, personnel associated with registered organizations, and/or organizations themselves. Individuals and organizations may be able to employ the risk management platform alongside other cyber security platforms. The risk management platform may, for example, work in conjunction with a subscribing organization's firewall to increase the overall cyber-security of the organization and associated individuals.

Users of the risk management platform may have the ability to manage and monitor data received by the security analysis engine based on user customizable settings. A user associated with a subscribing organization, such as cyber security or information technology professional, may, for example, be authorized to log in to the organization's account and to configure account settings. The authorized user may, for example, identify managers, executives, and board members of a corporation as individuals whose social profiles should be monitored. The authorized user may configure the organization's account to allow access to other users, and may allow different users to access the organization's account at different security levels. A chief executive officer (CEO) may, for example, be provided a higher level of access than that afforded to a recent hire employee.

A user with high security level access may be able to configure the risk management platform to use specific search settings, for example to scan specific social networks for specific data and/or threats, while a user with low security level access may be restricted from doing so. An Acme Inc. cyber security officer may, for example, have the ability to include Acme Incorporated as an alternate of the Acme Inc. company name that should be monitored by the risk management platform, and may indicate particular hashtags or trending topics to include in social networks scans. The cyber security officer may, for example, configure search settings to scan Twitter for occurrences of the hashtags #AcmeInc and #AcmeIncorporated. A user with high security level access may be able to configure the risk management platform to scan for predefined texts. For example, the user may configure the risk management platform to scan social networks for vulgar terms and/or inflammatory posts or comments. The user with high security level access may have the ability to configure the risk management platform to search for user defined texts. For example, the user may configure the risk management platform to scan social networks for confidential information, such as, account numbers and internal financial information.

The risk management platform may provide users with detailed data, analytics, and alerts, and users may be able to customize the type and amount of data, analytics, and alerts received. A user may, for example, elect to receive alerts via a risk management platform user interface, and/or via email, text message, or any other appropriate electronic messaging method.

Process 1100 begins when the one or more processors associated with the risk management platform determine a protected social entity based on one or more user inputs (1101). An individual or organization may, for example, purchase a risk management subscription and may register and configure a risk management account, thereby enabling the risk management platform to protect social entities associated with the configured account. In more detail, an authorized user of an account may access the risk management platform via web page, and may navigate the web-page to configure account settings, which may include identifiers of individuals and organizations whose social network profiles and activities should be monitored.

A security analysis engine 101 and/or user analysis engine 109 associated with the risk management platform may monitor data on one or more social networks that is related to the protected social entity (1103). The monitoring may include actively scanning one or more social networks. The security analysis engine 101 may, for example, identify a profile discovered on a social network bearing similarity to a profile of the protected social entity as a suspected imposter profile, and may monitor data associated with the suspected imposter profile. The security analysis engine may monitor and compare, for example, data associated with user name, profile image(s), demographic information, and contact information. If, for example, the protected social entity is an individual named Matthew Hillman, the security analysis engine may identify Matt H, Mat Hillman, Matthew Hilman, and M. Hillman, as suspected imposter profiles based on name similarity. In another example, the security analysis engine may identity as a suspected imposter profile a profile that presents a protected social entity's profile picture as its own.

In situations in which the protected social entity is an organization, the security analysis engine 101 may be configured to monitor social networks for profiles that list the protected social entity organization as an employer, and/or that feature a trademarked image associated with the protected organization. The security analysis engine may also identify profiles on social networks that include content associated with the protected social entity, for example, that name the protected social entity or that link to a web page associated with the protected social entity.

The security analysis engine 101 may determine a risk to the protected social entity, based on monitoring data on one or more social networks that is related to the protected social entity (1105). A risk to the protected social entity may be a risk associated with another social entity, for example, a risk associated with a friend or follower of the protected social entity engaged in distributing malware, with an imposter generating and maintaining a fraudulent profile impersonating the protected social entity, and/or with a malicious bot. A security analysis engine 101 may determine, for example, that an imposter profile maintained by a malicious bot engaged in phishing poses a high risk to the protected social entity. In another example, the security analysis engine 101 may determine by monitoring social networks that a friend or follower of the protected social entity has posted malware on a social wall and may, as a result of that determination, classify the friend or follower as posing a high risk to the protected social entity.

The risk management platform may provide risk management data to a user, for example, in the form of an alert following a determination of a risk posed to the protected social entity (1107). The risk management platform may be implemented as a cloud application, and may be accessed by an electronic device through a web portal. The risk management platform's user interface may be customizable, enabling authorized users to adjust the information presented. In some examples, the platform interface may display information relating to multiple users associated with an account, and may identify threats posed to one or more of the users. A subscribing organization's risk management home page may, for example, list names of protected employees or other personnel associated with the organization, and may display alerts associated with one or more of the listed individuals, the alerts flagging risks that, for example, exceed a risk threshold. A determination that a protected social entity is being impersonated may, for example, trigger the display and/or issuance of an alert.

Figure 12:
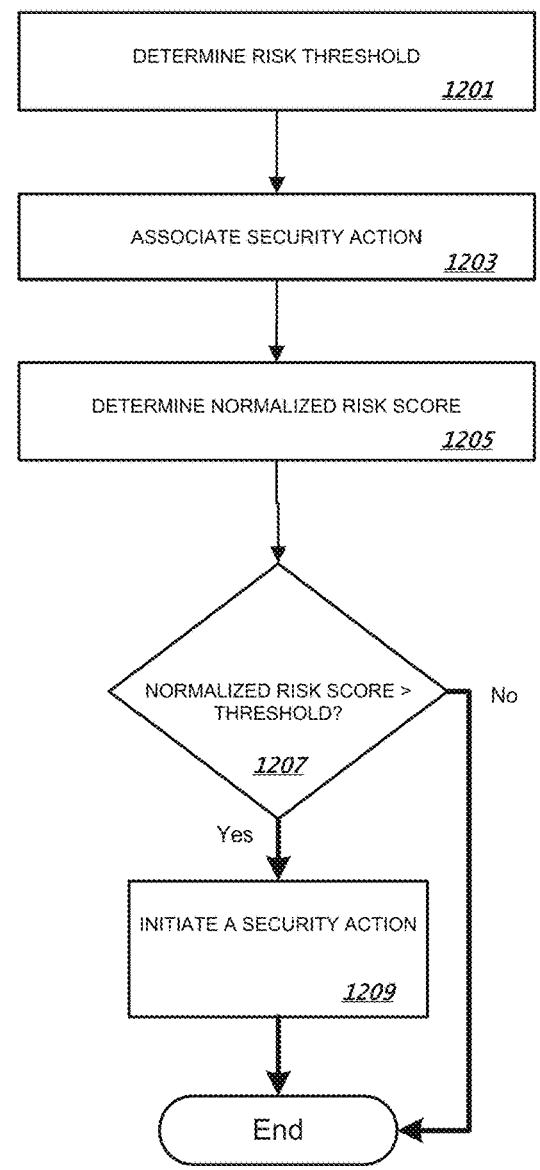
FIG. 12 is a flowchart of process 1200 for initializing a security action based on a determined risk threshold.

FIG. 12 is a flowchart of process 1200 for initializing a security action based on a determined risk threshold. The process 1200 may be implemented, for example, using system 100 in combination with one or more processors associated with the risk management platform.

Process 1200 begins when one or more processors at the risk management application determine a risk threshold (1201). The determination may be based on one or more user inputs. An authorized user may log into a registered account associated with an organization that has a subscription with the risk management platform offering, and may adjust the account settings to select a risk threshold. In some examples, the risk management platform may provide an authorized user with an option to select a risk threshold on a numeric scale, such as 0 to 100, thereby indicating that risks exceeding the threshold warrant further attention.

The risk management platform may provide a user with an option to select a risk threshold for a set period of time, for example, a risk threshold that is set to expire after one week, one month, or any other suitable time period. The risk management application may prompt the user to re-evaluate the risk threshold after the set period of time has expired. A user may also be provided with an option to select multiple risk thresholds. A user may, for example, specify 90 as a threshold for determining that a risk is "very high" and 75 as a threshold for determining that a risk is "high."

One or more processors associated with the risk management platform may associate one or more security actions with one or more risk thresholds (1203). The risk management platform may, for example, associate a web-based alert with a "high" threshold, and both web-based and email alerts with "very high" thresholds. The risk management platform may provide a user with the ability to select security action(s) associated with a risk threshold. A user may, for example, select that a risk exceeding a "very high" risk threshold should trigger a text message sent to the user's mobile device, in addition interaction with another program.

A user may employ other security software in addition the risk management platform, and may configure the risk management platform to provide data to the other software as part of a security action. A user may, for example, configure a firewall to block data associated with social entities determined by the risk management platform as posing a "very high risk." In another example, a user may opt to freeze interaction between protected social entities and a "high risk" profile, using management software associated with a social network.

The user analysis engine may determine a risk to the protected social entity by determining a normalized risk score for another social entity (1205). A risk score is an estimation of the security risk associated with the data associated with a social entity, that is, the postings and the actions of a social entity on one or more social networks. The risk score may be expressed as a normalized number on a range of 0-100. The user analysis engine may compare the normalized risk score for the social entity to the risk threshold to determine whether the normalized risk score exceeds the risk threshold (1207). If the normalized risk score for the social entity exceeds the risk threshold, the security analysis engine may initiate a security action (1211). The security action taken may be based on a security action associated with the exceeded risk threshold, for example, a security action specified by a user. In cases in which a normalized risk score for a social entity does not exceed a risk threshold, the security analysis engine may instead take no action (1213).

Figure 13:
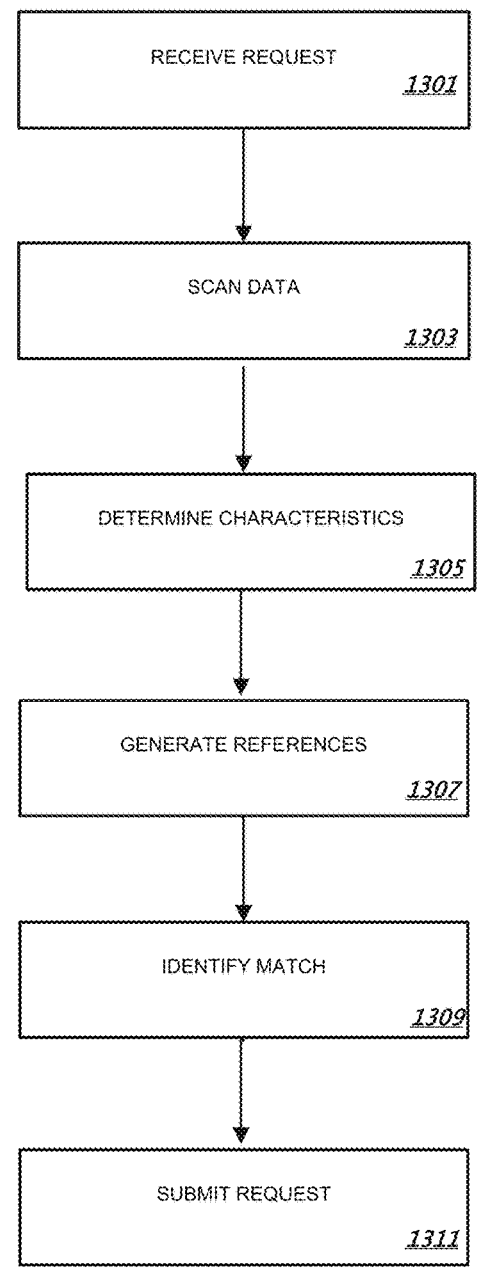
FIG. 13 is a flowchart of process 1300 for submitting a request to a social network to remove data.

FIG. 13 is a flowchart of a process 1300 for submitting a request to one or more social networks to remove identified data associated with one or more references associated with a protected social entity. The process 1300 may be implemented, for example, using system 100, although other systems or configurations may be used. In such an implementation, one or more parts of the process may be executed by security analysis engine 101. In such an implementation, one or more parts of the process may be executed by security analysis engine 101, which may interface with other computers through a network. In some implementations, the process may be executed by the user analysis engine 109, which may be included within the security analysis engine 101.

A user may wish to remove some or all mention of his or her presence, or his or her organization's presence, across multiple social networks. To facilitate this removal, the user may subscribe to a social threat protection tool, such as security analysis engine 101, thereby becoming a protected social entity. The protected social entity may be an individual, for example, John Doe, who may seek to remove any references to himself across one or more social networks. In some examples, the protected social entity may be an enterprise, association, university, organization, or a company. For example, the United States Marine Corps, may seek to remove any references to a member, Corporal Jane Row. In some implementations, the user may be an authorized user that is affiliated with the protected social entity. For example, the user may be an information technology professional or a cyber-security professional at an enterprise or corporation.

In more detail, a user may request the removal of data associated with a protected social entity. The user may have the ability to configure the user settings, through the social threat protection platform, to indicate what type of data associated with the protected social entity should be removed. For example, the user may indicate that all images of the protected social entity should be removed across all social networks. In some implementations, the user may indicate that all references and/or any mention to the protected social entity should be removed across the multiple social networks. The servers associated with the social threat protection platform may automate the detection of data associated with the protected social entity, and request the removal of the data from the one or more social networks where the data is hosted. The servers associated with the social threat protection tool may also constantly monitor the data maintained across the multiple social networks to detect any new occurrences of data associated with the protected social entity. Once new data associated with the protected social entity is detected, the servers may immediately request the removal of the data.

In some implementations, the protected social entity may request the removal of any data that is posted to one or more accounts of the protected social entity by another entity, and poses a security risk to the protected social entity. The servers at the social threat protection tool may automate the process of identifying data that poses a risk to the protected social entity, and the subsequent submission of a request for the removal of the data. The protected social entity may subscribe to the social threat protection tool, and may submit one or more thresholds for social network security risks. These thresholds may include thresholds for profile impersonations, the exposure to malware and adware, the exposure to phishing attempts, and the exposure objectionable content. In particular, the protected social entity may have the ability to fully customize what content should be considered as objectionable. For example, the protected social entity may specify postings about an ex-spouse should be considered objectionable.

In more detail, the servers at the social threat protection tool may continuously scan data maintained across multiple social networks for data that is associated with the protected social entity. Data that is associated with the protected social entity and that originates with another social entity may be analyzed to evaluate the level of security risk posed to the protected social entity. For example, data that is posted to the protected social entity's page, or sent to the protected social entity as a message may be analyzed to determine the risk to the protected social entity. The analysis of the data may involve the comparison to the one or more user selected risk thresholds. The servers at the social threat protection tool may submit a request to the hosting social network to remove the data that is determined as a risk to the protected social entity. The detection and submission of the request to the social network is automated by the servers at the social threat protection tool, and may not require any action from the protected social entity.

Process 1300 begins when a request to remove data that is associated with a protected social entity is received by one or more processors at the security analysis engine 101 (1301). The request may be made by a user through the social threat protection platform. The social threat protection platform may support subscriptions to one or more cyber-security applications and/or features. Users of the social threat protection platform may include individuals and/or organizations seeking to increase insight into risks posed by social entities, and to lessen susceptibility to fraud, user impersonation, negative social engineering, and other malicious behaviors. Users of the social threat protection platform may have the ability to manage and monitor data received by the security analysis engine based on user customizable settings. A user may have the ability to request the removal of data that is associated with a protected social entity across one or more social networks. The request may be received from an authorized user. The authorized user may be a user associated with an organization that subscribes to the social risk management platform, for example, an information technology professional or a cyber-security professional. The authorized user may be authorized to log in to the organization's account on the social threat protection platform. In some examples, the protected social entity may be an organization. In these examples, an authorized user may request the removal of data that is associated with the protected social entity. For example, an organization may have recently changed its name and may request the removal of any reference to the old organization name, employee position titles, and/or the company logo.

The request may include one or more customizable thresholds for the removal of data associated with the protected social entity. The user may set the thresholds for the removal of the data associated with the protected entity. In some implementations, the user may configure one or more tiers of data removal. The user may configure a tier one data removal request to involve the removal of any tags that are associated with the user name of the protected social entity. For example, a tier one request may remove any status tags, check-in tags, and/or image tags on Facebook that are tagged to the protected user. The user may configure a tier two data removal request to involve the removal of any tags that are associated with the user name of the protected social entity, and the removal of any images of the protected social entity. The tier two data removal request may be used when a higher threshold of security of a protected social entity is desired. For example, the protected social entity may be Corporal John Doe of the U.S. Marine Corps, and the authorized user associated with the U.S. Marine Corp organization may request the removal of any tags that are associated with John Doe, and the removal of any images of John Doe across the one or more social networks.

The security analysis engine may scan data that is maintained on one or more social networks (1303). In some implementations, the scanning of the one or more social networks may be conducted by a scanner that is hosted at an entity that is different and separate from the security analysis engine. In other implementations, the user analysis engine of the security analysis engine may scan the one or more social networks. The security analysis engine may actively scan multiple social networks for publicly available information and/or authorized available information. In some implementations, the security analysis engine may constantly scan across multiple social networks for data. In other implementations, the security analysis engine may only scan across multiple social networks during a set time period. The type of data that is scanned from the multiple social networks may vary depending on the particular social network. For example, publicly available information on a Facebook profile may include a profile picture and/or a profile status, whereas publicly available information on LinkedIn may include only a profile picture. Some social networks may recognize the security analysis engine 101 as an authorized user and may provide the security analysis engine with access to additional information that is not available to the general public. For example, as the security analysis engine scans across LinkedIn, Twitter, and Facebook, the one or more servers associated with these networks may recognize the security analysis engine as an authorized user, and may allow the engine to scan the data associated with profiles on these networks that may not share all profile details with the public.

The security analysis engine may scan data across the multiple social networks to identify data that is associated with one or more social entities. The security analysis engine may scan the profiles maintained by all the users of the multiple social networks. The security analysis engine may scan the profile pictures, other images posted to the profile, status messages, posted content, biographic information, and any other data associated with the one or more profiles of the one or more users of the multiple social networks. In some implementations, the security analysis may scan a subset of the social network profiles maintained across the multiple social networks.

The security analysis engine may determine one or more characteristics of the identified data (1305). Characteristics that may be determined for identified data may vary depending on the type of data. Identified data that is associated with a social entity may include, for example, the social entity's user name, history, contacts, and associated links and content. For an individual, the identified data may also include demographic information such as age, gender, location, and place of employment. Characteristics of a post may include, for example, language, timestamp, URL, domain or other information and metadata. In some instances, identified data may include data that is correlated. Audio/visual (A/V) content data and textual data may, for example, be correlated in an instance in which the text describes the A/V data. In another example, content data may be a URL to a link the text data may include a user profile that is associated with the link. For example, the identified data may include a link to the Acme, Inc. website that was posted by John Doe, an avid fan or detractor of Acme, Inc. In this example, the posted content or the link to the Acme, Inc. website may be determined to be characteristics of the identified data, in addition to characteristics that include correlations between data identified from John Doe's profile.

The security analysis engine may generate, for each of the one or more characteristics, a reference to the identified data that indicates the characteristic (1307). The reference corresponding to a characteristic may be a tag that identifies the characteristic. In some implementations, the generated reference may be a computer-readable tag, such as, binary code. In some examples, the reference to a characteristic may be a keyword that describes the characteristic. In some implementations, the generated reference may be a pointer to identified data. For example, the identified data may be stored in a database, and may be easily isolated from the database by the generated reference.

The security analysis engine may identify a match between the one or more generated references and one or more stored references (1311). The security analysis engine 101 may scan the one or more social networks profiles maintained by the protected social entity across multiple social networks. The security analysis engine may then identify one or more characteristics associated with the protected social entity. The security analysis engine may scan the protected social entity's profile, for example, for data including the protected social entity's user name, profile pictures, date of birth, gender, location, email address, education, and organization. The security analysis engine may generate one or more references to each of the one or more characteristics, and store the generated one or more references at a social risk database. The reference corresponding to a characteristic may be a tag that identifies the characteristic. In some implementations, the generated reference may be a computer-readable tag, such as, binary code. In some examples, the reference to a characteristic may be a keyword that describes the characteristic. The security analysis engine may store the one or more references to the characteristics of the protected social entity to minimize the amount of memory storage. In some implementations, however, both the references to the characteristics and the data associated with the characteristic are stored at the social risk database.

In some implementations, the protected social entity may not maintain any social network profiles. The protected social entity may be an individual who has not set up any profiles on any social networks. For example, Michael Jordan may be the President of the Federal Bureau of Investigation (FBI), and may not maintain any profiles of his own, but may wish to remove any mention and/or reference to him across the multiple social networks. In these implementations, the protected social entity may provide the security analysis engine with data, such as name, images, date of birth, gender, location, email address, education, and organization. The protected social entity may provide the information by submitting the data through the social threat protection platform. The security analysis engine may then generate one or more references to the data and store the references at a social risk database. In some implementations, the process may be executed by the user analysis engine 109.

The security analysis engine may compare the one or more generated references associated with one or more social entities to the one or more stored references associated with the protected social entity in order to determine similarity. The security analysis engine may use one or more techniques to compare the references. The security analysis engine may use photo hashing techniques to compare the one or more references generated for one or more images associated with the profiles of one or more social entities, to the stored references for images associated with the protected social entity. For example, the security analysis engine may generate a reference to an image that is associated with a social entity by deriving data from the image, and may compare the derived data with data derived from an image that is associated with the protected social entity. The security analysis engine may hash an image that is associated with a social entity, and may compare the hashed image with a hash of an image that is associated with the protected social entity. The security analysis engine may be able to detect if a social entity has posted an image of the protected social entity.

The security analysis engine may submit a request to the one or more social networks to remove the identified data associated with the one or more generated references (1313). In some implementations, the process may be executed by the user analysis engine 109. The security analysis engine may determine a match between one or more of the stored references associated with the protected social entity and the generated reference associated with one or more social entities. In response to determining a match, the security analysis engine may submit a request to the one or more social network that hosts the identified data, to remove the hosted data. The request may be submitted to the particular social network that hosts the identified data that is associated with the protected social entity. The request may be submitted as an email to the servers associated with the social network. In some implementations, the security analysis engine may use other forms of communication to request the removal of the identified data. In some implementations, the request to the social network may be submitted via an API.

In some implementations, the user may set one or more thresholds for the removal of data associated with the protected social entity. The user may identify particular instances that should prompt the removal of data associated with the protected social entity. For example, the user may indicate that any occurrence of an image of the protected social entity should be removed. For another example, the user may indicate that any tagging of the protected social entity to a post, status, comment image, or any other tag to the protected social entity should be removed. The user may indicate that mentioning the protected social entity's name may not warrant removal of the data, unless the data is associated with an image of the protected social entity, or is tagged to the social entity. The user may edit the one or more thresholds associated with the removal of the data. The user may log into the social threat protection platform to customize the user thresholds for the removal of data associated with the protected social entity. In some implementations, the user may set a time period for the removal of the data associated with the protected social entity. For example, the user may indicate to remove data associated with John Doe that is time stamped before Jan. 1, 2014.

In some implementations, the security analysis engine may generate an alert to the protected social entity. The alert may include the data identified and the request that was submitted to the social network requesting the removal of the data. In some implementations, the alert may be a web-based alert. The alert may also be received as an email, or as a text message on a mobile device of the protected social entity. In other implementations the protected social entity may be provided with visual alerts through the social threat protection platform. In some implementations, the security analysis engine may generate an alert to the social entity that originated the data associated with the protected social entity. The alert may include the identified data and a request for the removal of the identified data. For example, the security analysis engine may detect that Jane Roe posted an image of the protected John Doe, and may generate a request to the Jane Roe for the removal of the image. The alert to Jane may be sent as a message through the social network, or may be sent as an email.

Figure 14:
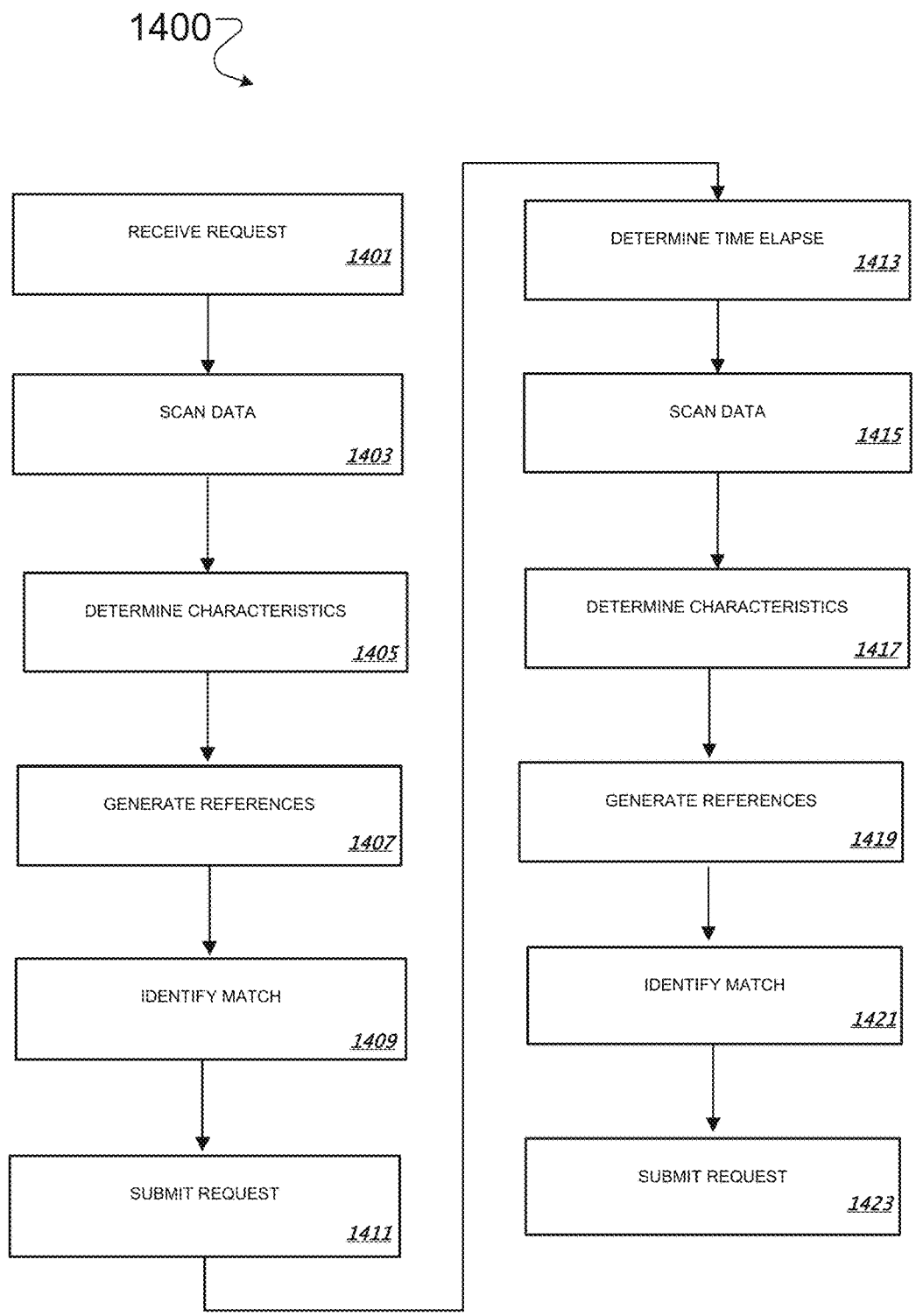
FIG. 14 is a flowchart of process 1400 for continuously scanning one or more social networks for data.

FIG. 14 is a flowchart of process 1400 for continuously scanning one or more social networks for data. The process 1400 may be implemented, for example, using system 100, although other systems or configurations may be used. In such an implementation, one or more parts of the process may be executed by security analysis engine 101. In such an implementation, one or more parts of the process may be executed by security analysis engine 101, which may interface with other computers through a network. In some implementations, the process may be executed by the user analysis engine 109, which may be included within the security analysis engine 101.

Process 1400 begins when the one or more processors at the security analysis engine 101 receives a request to remove data that is associated with a protected entity (1401). The request may be made by a user through the social threat protection platform. The request may identify a protected social entity. Users of the social threat protection platform may include individuals and/or organizations seeking to increase insight into risks posed by social entities, and to lessen susceptibility to fraud, user impersonation, negative social engineering, and other malicious behaviors. Users of the risk management platform may have the ability to manage and monitor data received by the security analysis engine based on user customizable settings. A user may have the ability to request the removal of data that is associated with a protected social entity across one or more social networks. The request may be received from an authorized user. The authorized user may be a user associated with an organization that subscribes to the social threat protection platform, for example, an information technology professional or a cyber-security professional. The authorized user may be authorized to log in to the organization's account on the social threat protection platform. In some examples, the protected social entity may be an organization. In these examples, an authorized user may request to remove data that is associated with the protected social entity.

The security analysis may scan data that is maintained on one or more social networks (1403). In some implementations, the scanning of the one or more social networks may be conducted by a scanner that is hosted at an entity that is different and separate from the security analysis engine. In other implementations, the user analysis engine of the security analysis engine may scan the one or more social networks. The security analysis engine may actively scan multiple social networks for publicly available information and/or authorized available information. In some implementations, the security analysis engine may constantly scan across multiple social networks for data. In other implementations, the security analysis engine may only scan during a set time period. The type of data that is scanned from the multiple social networks may vary depending on the particular social network. The security analysis engine may scan data across the multiple social networks to identify data that is associated with one or more social entities. The security analysis engine may scan the profiles maintained by all the users of the multiple social networks. The security analysis engine may scan the profile pictures, other images posted to the profile, status messages, posted content, biographic information, and any other data associated with the one or more profiles of the one or more users of the multiple social networks. In some implementations, the security analysis engine may scan the data across all the social network profiles maintained across all the multiple social networks. In some implementations, the security analysis may scan a subset of the social network profiles maintained across the multiple social networks.

The security analysis engine may determine one or more characteristics of the identified data (1405). Characteristics that may be determined for identified data may vary depending on the type of data. Identified data that is associated with a social entity may include, for example, the social entity's user name, history, contacts, and associated links and content. For an individual, the identified data may also include demographic information such as age, gender, location, and place of employment. Characteristics of a post may include, for example, language, timestamp, URL, domain or other information and metadata. In some instances, identified data may include data that is correlated. Audio/visual (A/V) content data and textual data may, for example, be correlated in an instance in which the text describes the A/V data.

The security analysis engine may generate, for each of the one or more characteristics, a reference to the identified data that indicates the characteristic (1407). The reference corresponding to a characteristic may be a tag that identifies the characteristic. In some implementations, the generated reference may be a computer-readable tag, such as, binary code. In some examples, the reference to a characteristic may be a keyword that describes the characteristic.

The security analysis engine may identify a match between the one or more generated references and one or more stored references (1409). The security analysis engine may store one or more references to one or more characteristics associated with the protected social entity. The security analysis engine 101 may scan the one or more social networks profiles maintained by the protected social entity across multiple social networks. The security analysis engine may then identify one or more characteristics associated with the protected social entity. The security analysis engine may scan the protected social entity's profile, for example, for data including the protected social entity's user name, profile pictures, date of birth, gender, location, email address, education, and organization. The security analysis engine may generate one or more references to each of the one or more characteristics, and store the generated one or more references at a social risk database. The reference corresponding to a characteristic may be a tag that identifies the characteristic. In some implementations, the generated reference may be a computer-readable tag, such as, binary code. In some examples, the reference to a characteristic may be a keyword that describes the characteristic. The security analysis engine may store the one or more references to the characteristics of the protected social entity to minimize the amount of memory storage. In some implementations, however, both the references to the characteristics and the data associated with the characteristic are stored at the social risk database.

The security analysis engine may compare the one or more generated references associated with one or more social entities to the one or more stored references associated with the protected social entity to determine the similarity. The security analysis engine may use one or more techniques to compare the references. The security analysis engine may use photo hashing techniques to compare the one or more references generated for one or more images associated with the profiles of one or more social entities to the stored references for images associated with the protected social entity. For example, the security analysis engine may generate a reference to an image that is associated with a social entity by deriving data from the image, and may compare the derived data with data derived from an image that is associated with the protected social entity. The security analysis engine may hash an image that is associated with a social entity, and may compare the hashed image with a hash of an image that is associated with the protected social entity. The security analysis engine may be able to detect if a social entity has posted an image of the protected social entity.

The security analysis engine may also compare a stored reference to the protected social entity's name to the generated reference for the status message, or postings on the profile of one or more social entities. The security analysis engine may detect if any social entity has posted the name of the protected social entity. For example, a social entity may tag John Doe in a Facebook status, the security analysis engine may compare the stored reference for the protected social entity, John Doe, to the reference generated for the post of the social entity, and determine a match of the references. Similarly, the security analysis engine may detect if a social entity tags the protected social entity in a posting on LinkedIn, Twitter, or any other social network.

The security analysis engine may submit a request to the one or more social networks for the removal of the identified data associated with the one or more generated references (1411). In some implementations, the process may be executed by the user analysis engine 109. The security analysis engine may determine a match between one or more of the stored references associated with the protected social entity and the generated references associated with one or more social entities. In response to determining a match, the security analysis engine may submit a request to the one or more social network that hosts the identified data, for the removal of the hosted data. The request may be submitted to the particular social network that hosts the identified data that is associated with the protected social entity. The request may be submitted as an email to the servers associated with the social network. In some implementations, the security analysis engine may use other forms of communication to request the removal of the identified data. In some implementations, the request to the social network may be submitted via an API.

The security analysis engine may determine that a predetermined period of time has elapsed (1413). In some implementations, the security analysis engine may continuously scan the data maintained across multiple social networks. The security analysis engine may continuously scan the multiple social networks to detect the occurrence of a reference and/or mention of the protected social entity at the earliest instance. In these implementations, the security analysis engine may determine that a scanning cycle is complete, and may then re-scan the multiple social networks for any new references to the protected social entity. In some implementations, the user may set the frequency of the scanning. For example, the user may set the security analysis engine to scan the multiple social networks once a day. In some implementations, the security analysis engine may scan the multiple social networks, once a day, twice a day, three times a day, or any other suitable number of times.

The security analysis engine may scan data that is maintained on one or more social networks in response to determining the predetermined period of time has elapsed (1415). As described earlier, the security analysis engine may continuously scan the multiple social networks to detect the occurrence of any new references to the protected social entity. The security analysis engine may scan data across the multiple social networks to identify data that is associated with one or more social entities. The security analysis engine may scan the profiles maintained by all the users of the multiple social networks. The security analysis engine may scan the profile pictures, other images posted to the profile, status messages, posted content, biographic information, and any other data associated with the one or more profiles of the one or more users of the multiple social networks. In some implementations, the security analysis engine may scan the data across all the social network profiles maintained across all the multiple social networks. In some implementations, the security analysis may scan a subset of the social network profiles maintained across the multiple social networks.

The security analysis engine may determine one or more characteristics of the additional identified data (1417). Characteristics that may be determined for identified data may vary depending on the type of data. Identified data that is associated with a social entity may include, for example, the social entity's user name, history, contacts, and associated links and content. The security analysis engine may generate, for each of the one or more characteristics, an additional reference, where the additional reference is a reference to the additional identified data that indicates the characteristic to the identified data that indicates the characteristic (1419). The reference corresponding to a characteristic may be a tag that identifies the characteristic. In some implementations, the generated reference may be a computer-readable tag, such as, binary code. In some examples, the reference to a characteristic may be a keyword that describes the characteristic.

The security analysis engine may identify a match between one or more additional generated references and one or more stored references (1421). In some implementations, the process may be executed by the user analysis engine 109. The security analysis engine may compare the additional one or more generated references associated with one or more social entities to the one or more stored references associated with the protected social entity to determine. The security analysis engine may use one or more techniques to compare the references.

The security analysis engine may submit a request to the one or more social networks for the removal of the identified data associated with the one or more additional generated references (1423). In some implementations, the process may be executed by the user analysis engine 109. The security analysis engine may determine a match between one or more of the stored references associated with the protected social entity and the additional generated references associated with one or more social entities. In response to determining a match, the security analysis engine may submit a request to the one or more social network that hosts the identified data, for the removal of the hosted data. The request may be submitted to the particular social network that hosts the identified data that is associated with the protected social entity. The request may be submitted as an email to the servers associated with the social network. In some implementations, the security analysis engine may use other forms of communication to request the removal of the identified data. In some implementations, the request to the social network may be submitted via an API.

Figure 15:
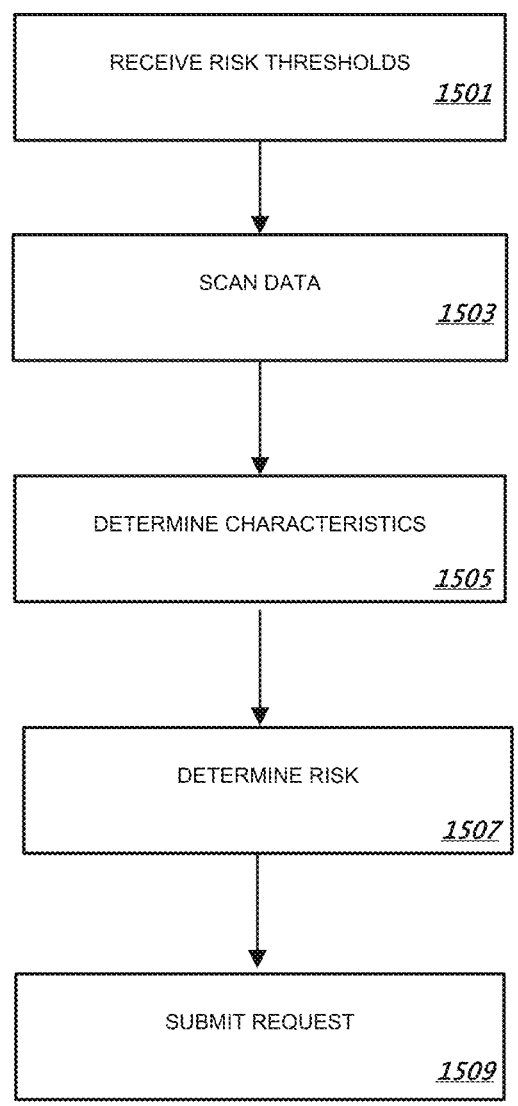
FIG. 15 is a flowchart of process 1500 for submitting a request to a social network for the removal of data associated with a risk.

FIG. 15 is a flowchart of process 1500 for submitting a request to a social network for the removal of data associated with a risk. The process 1500 may be implemented, for example, using system 100, although other systems or configurations may be used. In such an implementation, one or more parts of the process may be executed by security analysis engine 101. In such an implementation, one or more parts of the process may be executed by security analysis engine 101, which may interface with other computers through a network. In some implementations, the process may be executed by the user analysis engine 109, which may be included within the security analysis engine 101.

Process 1500 begins when the servers associated with the social threat protection tool receive a risk threshold from a protected social entity (1501). The protected social entity may log into a secured account with the social threat protection tool, and may customize the security settings. In some implementations, the account with the social threat protection tool may be managed by an authorized user. In these implementations, the authorized user may customize the security settings for one or more protected social entities. The risk threshold may include a profile impersonation threshold, a spam threshold, an adware threshold, a malware threshold, a phishing threshold, and an objectionable content threshold. In some implementations, the more risk threshold may include other thresholds for social security risks.

The profile impersonation threshold allows the user to set a tolerance level for profile impersonation for the protected social entity. In some implementations, the profile impersonation threshold may have one or more selectable levels. For example, the user may have the choice from a high, medium, and low profile impersonation threshold. The spam threshold allows the user to set a tolerance level for the protected social entity's exposure to spam. The user may select a zero tolerance threshold for exposure to spam. For example, the user may select for the removal of any detected spam from the one or more profiles maintained by the protected social entity. The adware threshold allows the user to set a tolerance level for the protected social entity's exposure to adware. The user may select a zero tolerance threshold for exposure to adware. Similarly, the phishing threshold allows the protected social entity to set a tolerance level for the protected social entity's exposure to phishing attempts. The user may select a zero tolerance threshold for exposure to an entity performing phishing.

The objectionable content threshold allows the user to identify one or more content items as content that poses a risk to the protected social entity. The user may edit the content items to include all items that should be considered a risk to the protected social entity. The user may have the ability to enter any number of objectionable content items. For example, the user may list the name and logo of a company's main competitor as objectionable content items. The servers at the social threat protection tool may detect when any of the one or more selected objectionable content items are posted to and/or otherwise associated with the one or more profiles of the protected social entity across multiple social networks. In some implementations, the user may select profanity, or offensive language as objectionable content.

The security analysis engine 101 may actively scan data that is maintained across multiple social networks (1503). In some implementations, the scanning of the one or more social networks may be conducted by a scanner that is hosted at an entity that is different and separate from the security analysis engine. In other implementations, the user analysis engine of the security analysis engine may scan the one or more social networks. The security analysis engine may actively scan multiple social networks for publicly available information and/or authorized available information. In some implementations, the security analysis engine may constantly scan across multiple social networks for data. In other implementations, the security analysis engine may only scan during a set time period.

The security analysis engine may scan data across the multiple social networks to identify data that is associated with the protected social entity. The security analysis engine may scan the multiple social networks for links posted to the one or more profiles of the protected entity, for images and/or other content that the protected social entity maybe be tagged to, for status messages that the protected social entity may be tagged in, for messages or other types of correspondence between the protected social entity and any other social entities, and any other suitable data associated with the one or more social network profiles of the protected social entity. In some implementations, the security analysis engine may continuously scan the data maintained across multiple social networks. The security analysis engine may continuously scan the multiple social networks to detect the occurrence of data associated with the protected social entity at the earliest instance. In these implementations, the security analysis engine may determine that a scanning cycle is complete, and may then re-scan the multiple social networks for any new data associated with the protected social entity. In some implementations, the user may set the frequency of the scanning. For example, the user may set the security analysis engine to scan the multiple social networks once a day. In some implementations, the security analysis engine may scan the multiple social networks, once a day, twice a day, three times a day, or any other suitable number of times.

The security analysis engine may determine one or more characteristics of the identified data (1505). Characteristics that may be determined for the identified data may vary depending on the type of data identified. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. The characteristics are indicative of the data related to the social entity and the activities of the social entity. User analysis engine 109 may generate references to identified data, and to characteristics of identified data.

Following a determination of the characteristics of the identified data, security analysis engine may determine a risk to the protected social entity, based on the one or more characteristics of the data identified across the multiple social networks (1507). The security analysis engine may determine a risk to the protected social entity from detecting profile impersonation, detecting a social entity posted malware or adware to a profile of the protected social entity, a social entity attempting to phish, or detecting objectionable content on one or more profiles of the protected social entity. The risk may be detected if the one or more risk thresholds are exceeded. In some implementations, the security analysis engine may generate an alert to the protected social entity if one or more of the security risk threshold are exceeded.

The security analysis engine may detect impersonation of the protected social entity. The security analysis engine may generate a reference to the identified data that indicates the characteristic, for each of the one or more characteristics of the identified data associated with the protected social entity. The reference corresponding to a characteristic may be a tag that identifies the characteristic. In some implementations, the generated reference may be a computer-readable tag, such as, binary code. In some examples, the generated reference may be a pointer to a segment of a database that stores the identified data. In these implementations, the security analysis engine may use the generated reference to quickly access the identified data tagged with the reference. In some examples, the reference to a characteristic may be a keyword that describes the characteristic.

The security analysis engine may compare the one or more generated references to one or more characteristics associated with one or more social entities. The security analysis engine may continuously scan the multiple social networks for data associated with one or more social entities. The security analysis engine may generate references for, and store at a social risk database, the references to the characteristics of the data associated with the one or more social entities. The comparison of the generated characteristics may be an algorithmic comparison of the references. In some implementations, the references used for comparison may be dynamically selected from the available references. For example, only a subset of the generated references associated with the protected social entity may be used during a comparison with the generated references associated with the one or more other social entities. The security analysis engine may determine a profile score for the one or more social entities based on the algorithmic comparison of the generated references. The determined profile score evaluates the likelihood of impersonation of the protected social entity. The one or more profile scores for the one or more social entities are compared to the user set impersonation threshold. The user may have the ability to select between a high, medium, and low impersonation threshold. An impersonation risk to the protected social entity is determined based on at least one profile score of the one or more social entities exceeding the impersonation risk threshold. The social entity associated with the profile score that exceeds the impersonation risk threshold is determined as impersonating the protected social entity. In some implementations, the security analysis engine may submit a request to the social entity requesting the removal of the impersonating profile.

The security analysis engine may detect whether a social entity posted malware to one or more profiles of the protected social entity. The security analysis engine may detect whether a social entity associated the protected social entity with malware. The user may set a zero tolerance level for malware, any instance of the detection of malware associated with the protected social entity may be identified as a risk. The security analysis engine may determine one or more characteristics associated with malware. For example, a social entity may send a message to the protected social entity's eHarmony profile, the security analysis engine may determine that the message includes an infected URL. The security analysis engine may identify the social entity that originates the data associated with the one or more characteristics. In some implementations, the security analysis engine may submit a request to the identified social entity for the removal of the data associated with malware.

Similarly, the security analysis engine may detect whether a social entity posted adware to one or more profiles of the protected social entity. The security analysis engine may detect whether a social entity otherwise associated the protected social entity with adware. The user may set a zero tolerance level for adware, any instance of the detection of adware associated with the protected social entity may be identified as a risk. The security analysis engine may determine one or more characteristics associated with adware. The security analysis engine may identify the social entity that originates the data associated with the one or more characteristics. In some implementations, the security analysis engine may submit a request to the identified social entity for the removal of the data associated with the one or more characteristics that include adware.

The security analysis engine may detect whether a social entity is attempting to phish information from the protected social entity. The user may set a zero tolerance level for phishing attempts, any instance of the detection of phishing attempts associated with the protected social entity may be identified as a risk. The security analysis engine may determine one or more characteristics associated with phishing. The security analysis engine may identify the social entity that originates the data associated with the one or more characteristics. In some implementations, the security analysis engine may submit a request to the identified social entity for the removal of the data associated with the one or more characteristics associated with phishing.

The security analysis engine may detect whether a social entity posted/or otherwise associated objectionable content to one or more profiles associated with the protected social entity. The user may identify one or more content items as objectionable content. The security analysis engine may continuously scan data across the multiple social networks to identify data associated with the protected social entity, and determine one or more characteristics of the identified data include objectionable content. The security analysis engine may compare the user selected objectionable content items to the one or more determined characteristics of the identified data associated with the protected social entity to determine whether the one or more characteristics include objectionable content. The security analysis engine may determine a risk to protected social entity if there is a match between the one or more characteristics of the identified data and the user selected objectionable content.

The security analysis engine may submit a request to a social network for the removal of the data associated with the risk (1509). The request may be submitted through an API. The security analysis engine may automate the process by detecting the one or more risks to the protected social entity and submitting the request to the particular social network without awaiting input from the user. For example, the security analysis engine may detect malware posted to the protected user's Twitter page, and may automatically request the removal of the data from Twitter without requiring approval from the protected social entity. In some implementations, the social network may require the security analysis engine to have authorization to submit a request on behalf of the protected social entity. In some implementations, the security analysis engine may generate an alert to the protected social entity in response to detecting a risk. In these implementations, the security analysis engine may submit a request to remove the data associated with the detected risk when the protected social entity provides approval. The security analysis engine may include one or more reasons for requesting the removal of the data. For example, the security analysis engine may include that the reason for requesting the removal of a link posted to a link on a Facebook profile is that the URL contains malware or adware.

The security analysis engine may identify the social entity that originates the data associated with the determined risk. The social entity that originates the data associated with the determined risk may be a social entity that is attempting to impersonate the protected social entity. The social entity that originates the data associated with the determined risk may be a social entity that posts a link that contains malware or adware to the profile of the protected social entity. The security analysis engine may submit a request to the identified social entity for the removal of the data. In some implementations, the security analysis engine may submit a request for the removal of the profile of the identified social entity. For example, the security analysis engine may determine that a social entity is impersonating the protected social entity, and may request a removal of one or more of the profiles associated with the social entity.

Different organizations and individuals have unique social media assets to protect, and conditions that constitute a threat to the social media assets vary based on the organizations business, mission, public image, and several other factors. The course of action taken when a threat is identified may also vary by organization. For example, a particular organization may wish to simply be notified of potential imposter profiles, on the other hand another organization may wish to have potential imposter profiles identified and subsequently removed from the social networks. The organizations's social media policies define the conditions for identifying social media content, and the corresponding action that should be performed in response to a condition being meet. The system described herein allows end users to define their own custom policies within the framework of the security analysis engine. The end users have the ability to implement the generic policies, and may also define policies that are specific to an individual or organization. The system allows the specific policies to be dynamically loaded without a need to modify or re-deploy updated versions of the core systems. The end user may specify the type of social media content that is analyzed and the rules that are applied to the content.

Figure 16:
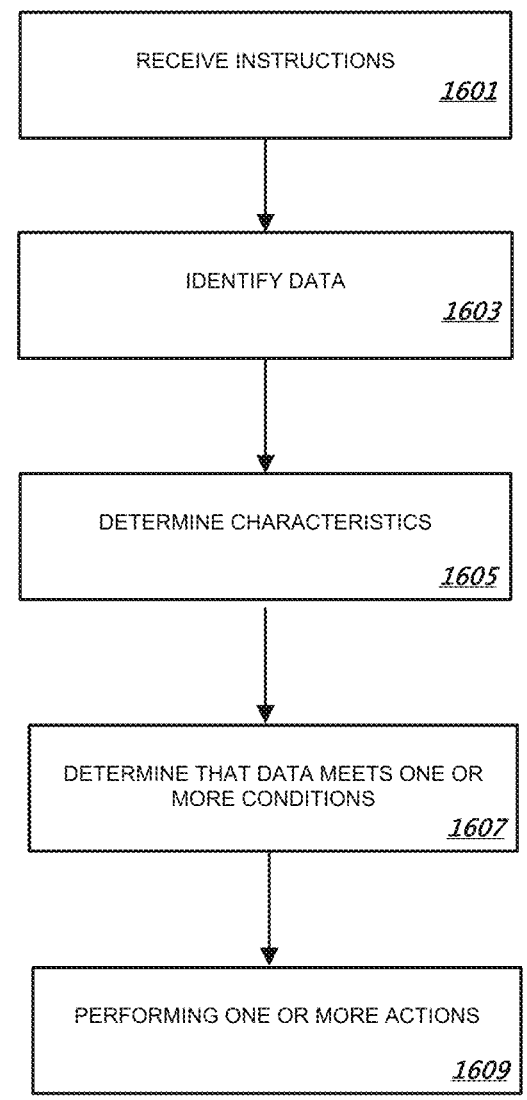
FIG. 16 is a flowchart of process 1600 for performing one or more actions.

FIG. 16 is a flowchart of the process 1600 for performing one or more actions specified in the instructions received from the user. The process 1600 may be implemented, for example, using system 100, although other systems or configurations may be used. In such an implementation, one or more parts of the process may be executed by security analysis engine 101. In such an implementation, one or more parts of the process may be executed by security analysis engine 101, which may interface with other computers through a network. In some implementations, the process may be executed by the user analysis engine 109, which may be included within the security analysis engine 101.

Process 1600 begins when the security analysis engine receives instructions from a user (1601). The instructions received from the user includes one or more conditions for identifying data on one or more social networks. The security analysis engine is a server that manages a social network security protection service. The social security protection service provides each of its registered users with proactive social network risk protection. The registered users of the social network security protection service may be individuals or corporate entities that wish to avoid targeted social-based cyber-attacks. The registered users may access the social network security protection service by logging on to a platform that hosts the service. A registered user may identify a protected social entity. For example, a protected social entity may be an individual, John Doe, and a protected social entity may be a corporation, Acme. Inc.

As described above, the security analysis engine, proactively scans data across the multiple social networks to identify malicious data associated with a registered protected social entity. The security analysis engine is configured to identify targeted social-based cyber-attacks, fraud, impersonation, and other forms of social engineering that target the protected social entity. For example, the security analysis engine may identify social entities that are attempting to harm the protected social entity by phishing, or posting malware or other malicious data to at least one social network profile of the protected social entity.

Each of the one or more protected social entities that are registered with the social network security protection service may have different interests in identifying social network risks, and each may have different threshold for the identified risks. The system described herein allows the user to define custom policies used by the security analysis engine to identify social media data using a domain specific language. The security analysis engine provides the user with a managed environment for executing code for the custom policies. The security analysis engine provides a plurality of tools that are specific to the domain for analyzing social media content. The custom policies defined by the user are instructions specific to the particular individual or organization enrolled in the social network security protection service. For example, a celebrity protected social entity may define a condition to identify tweets that include both negative and positive mention of a particular outfit worn to an event, and define an action of sending a notification to the entity when the condition is met.

The instructions include the one or more conditions for identifying social media threats, and one or more actions to be taken when a condition is met. The user may use executable scripting language code to identify the one or more conditions and one or more actions. For example, the user may user JavaScript to identify the one or more conditions and one or more actions. In some implementations, any suitable scripting language code may be used. The security analysis engine then executes the provided code. In some implementations, the user analysis engine executes the provided code.

The security analysis engine identifies data that is associated with one or more social entities on one or ore more social networks (1603). The security analysis engine may include a scanner that actively scans social networks for data. The scanner may be hosted at an entity that is different and separate from the security analysis engine 101. Alternatively, the scanner may be part of, or otherwise associated with, the security analysis engine 101, and may be integrated into the system 100 illustrated in FIG. 1. The security analysis engine may continuously scan the one or more social networks for data associated with the protected social entity that meets the one or more conditions set by the user. For example, a corporate protected social entity may wish to identify tweets and submit a request to takedown of any tweet that includes negative comments about the protected social entity when the tweet is retweeted more than one hundred times.

The security analysis engine determines one or more characteristics of the identified data (1605). Characteristics that may be determined for the identified data may vary depending on the type of data identified. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. Determined data characteristics may indicate activities of a social entity.

The security analysis engine determines that the identified data meets one or more conditions specified in the instructions received from the user (1607). The security analysis engine may identify data across the one or more social networks that is associated with the protected social entity, and may compare the determine characteristics of the identified data to the one or more conditions. The security analysis engine performs one or more actions specified in the instructions received from the user in response to determining that the identified data meets one or more conditions specified in the instructions from the user (1609). Each of the one or more conditions set by the user in the instructions may have an associated action to be performed when the condition is meet. The user has the ability to customize the action that is performed when the security analysis engine determines that a condition was met. For example, the user may wish to receive a notification when a condition is met. In other examples, the user may wish to initiate a request to remove identified data when a condition is met. A user may wish to block another social entity based on the social entity's association with identified data. In some examples, the monitoring server may perform one or more options when a condition is met. For example, the user may wish to receive a notification and submit a request to a network to delete an identified imposter profile.

A number of implementations have been described. Nevertheless, it will be understood that various modifications may be made without departing from the spirit and scope of the disclosure.

In addition, logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

What is claimed is:

1. A computer implemented method comprising:
   receiving instructions from a user for identifying data on one or more social networks, wherein the instructions received from the user comprise a content condition and an interaction condition and one or more actions, wherein the interaction condition comprises a threshold number of interactions and the content condition defines social media content characteristics;
   automatically scanning to identify, on the one or more social networks, a social media post by a social entity;
   analyzing the social media post to determine one or more characteristics of the social media post, the one or more characteristics comprising a URL, destination content, domain information, interaction information, and host information;
   determining that the one or more characteristics of the social media post match the content condition and that the interaction information exceeds the interaction condition; and
   in response to determining that the one or more characteristics of the social media post match the content condition and that the interaction information exceeds the interaction condition, performing one or more actions specified in the instructions received from the user, wherein the one or more actions comprise at least one of initiating a request to remove the social media post or blocking the social entity.

2. The method of claim 1, further comprising receiving additional instructions from the user, wherein the additional instructions received from the user comprise one or more additional conditions and one or more additional actions.

3. The method of claim 2, further comprising determining, based on the one or more characteristics of the social media post, that the social media post meets one or more additional conditions specified in the additional instructions received from the user;
   in response to determining that the social media post meets the one or more additional conditions specified in the additional instructions received from the user, performing one or more additional actions specified in the additional instructions received from the user.

4. The method of claim 1, wherein the instructions received from the user comprise code executable by one or more processors.

5. The method of claim 4, wherein the instructions received from the user comprise scripting language code.

6. The method of claim 1, further comprising continuously scanning the one or more social networks, wherein data that is associated with the social entity is identified during a scan.

7. The method of claim 1, wherein the instructions received from the user specify the one or more social networks.

8. The method of claim 1, wherein the instructions received from the user specify the social entity.

9. The method of claim 1, wherein the one or more actions specified in the instructions received from the user comprise generating a notification.

10. A system comprising:
    one or more processing devices; and
    one or more non-transitory computer-readable media coupled to the one or more processing devices having instructions stored thereon which, when executed by the one or more processing devices, cause the one or more processing devices to perform operations comprising:
    receiving instructions from a user for identifying data on one or more social networks, wherein the instructions received from the user comprise a content condition and an interaction condition and one or more actions, wherein the interaction condition comprises a threshold number of interactions and the content condition defines social media content characteristics;
    automatically scanning to identify, on the one or more social networks, a social media post by a social entity;
    analyzing the social media post to determine one or more characteristics of the social media post, the one or more characteristics comprising a URL, destination content, domain information, interaction information, and host information;
    determining that the one or more characteristics of the social media post match the content condition and that the interaction information exceeds the interaction condition; and
    in response to determining that the one or more characteristics of the social media post match the content condition and that the interaction information exceeds the interaction condition, performing one or more actions specified in the instructions received from the user, wherein the one or more actions comprise at least one of initiating a request to remove the social media post or blocking the social entity.

11. The system of claim 10, further comprising receiving additional instructions from the user, wherein the additional instructions received from the user comprise one or more additional conditions and one or more additional actions.

12. The system of claim 11, further comprising determining, based on the one or more characteristics of the social media post, that the social media post meets one or more additional conditions specified in the additional instructions received from the user; in response to determining that the social media post meets the one or more additional conditions specified in the additional instructions received from the user, performing one or more additional actions specified in the additional instructions received from the user.

13. The system of claim 10, wherein the instructions received from the user comprise code executable by one or more processors.

14. The system of claim 13, wherein the instructions received from the user comprise scripting language code.

15. The system of claim 10, further comprising continuously scanning the one or more social networks, wherein data that is associated with the social entity is identified during a scan.

16. The system of claim 10, wherein the instructions received from the user specify the one or more social networks.

17. The system of claim 10, wherein the instructions received from the user specify the social entity.

18. A non-transitory computer-readable storage device encoded with a computer program, the program comprising instructions that when executed by a data processing apparatus cause the data processing apparatus to perform operations comprising:

receiving instructions from a user for identifying data on one or more social networks, wherein the instructions received from the user comprise a content condition and an interaction condition and one or more actions, wherein the interaction condition comprises a threshold number of interactions and the content condition defines social media content characteristics;

automatically scanning to identify, on the one or more social networks, a social media post by a social entity;

analyzing the social media post to determine one or more characteristics of the social media post, the one or more characteristics comprising a URL, destination content, domain information, and host information;

determining, that the one or more characteristics of the social media post match the content condition and that the interaction information exceeds the interaction condition;

in response to determining that the one or more characteristics of the social media post match the content condition and that the interaction information exceeds the interaction condition, performing one or more actions specified in the instructions received from the user, wherein the one or more actions comprise at least one of initiating a request to remove the social media post or blocking the social entity.

* * * * *